US008804645B2

(12) United States Patent
Kim et al.

(10) Patent No.: US 8,804,645 B2
(45) Date of Patent: Aug. 12, 2014

(54) APPARATUS AND METHOD FOR TRANSMITTING UPLINK CONTROL INFORMATION

(75) Inventors: Ki Jun Kim, Anyang-si (KR); Eun Sun Kim, Anyang-si (KR); Han Byul Seo, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 13/496,476

(22) PCT Filed: Sep. 13, 2010

(86) PCT No.: PCT/KR2010/006241
§ 371 (c)(1),
(2), (4) Date: Mar. 15, 2012

(87) PCT Pub. No.: WO2011/034321
PCT Pub. Date: Mar. 24, 2011

(65) Prior Publication Data
US 2012/0176996 A1 Jul. 12, 2012

Related U.S. Application Data
(60) Provisional application No. 61/243,149, filed on Sep. 16, 2009.

(51) Int. Cl.
*H04W 4/00* (2009.01)
(52) U.S. Cl.
USPC .......................................... 370/329
(58) Field of Classification Search
CPC .................................... H04W 28/04
USPC ............................. 370/252, 329
See application file for complete search history.

(56) References Cited

U.S. PATENT DOCUMENTS

| 2011/0142095 | A1* | 6/2011 | Guo et al. ............... 375/133 |
| 2011/0268087 | A1* | 11/2011 | Kwon et al. ............ 370/331 |
| 2012/0106450 | A1* | 5/2012 | Golitschek Edler Von Elbwart et al. ............ 370/328 |
| 2012/0275398 | A1* | 11/2012 | Chen et al. ............. 370/329 |

(Continued)

FOREIGN PATENT DOCUMENTS

KR 1020100002114 1/2010

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213 V81.0, Nov. 2007.

(Continued)

*Primary Examiner* — Hassan Kizou
*Assistant Examiner* — Abdullahi Ahmed
(74) *Attorney, Agent, or Firm* — Lee, Hong, Degerman, Kang & Waimey

(57) ABSTRACT

The present invention is directed to a wireless communication system. Specifically, the present invention is directed to a method and apparatus for transmitting uplink control information through a Physical Uplink Shared Channel (PUSCH) at a user equipment, including receiving configuration information for periodic PUSCH transmission through a first protocol layer signaling, receiving information indicating activation or deactivation of the periodic PUSCH transmission through a second protocol layer signaling, wherein the second protocol layer is lower than the first protocol layer, and periodically transmitting the uplink control information through the PUSCH according to the configuration information if the periodic PUSCH transmission is activated.

8 Claims, 16 Drawing Sheets

(56) References Cited

U.S. PATENT DOCUMENTS

2013/0039202 A1* 2/2013 Feuersanger et al. ......... 370/252
2013/0100896 A1* 4/2013 Chen et al. .................... 370/329
2013/0322276 A1* 12/2013 Pelletier et al. ............... 370/252

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213 V8.0.0, Sep. 2007.

European Patent Office Application Serial No. 10817390.7, Search Report dated Mar. 1, 2013, 12 pages.

Sharp, "Proposal for CQI feedback reconfiguration," R1-073949, 3GPP TSG RAN Meeting #50bis, Oct. 2007, XP-050107507, 3 pages.

Nokia Siemens Networks et al., "Configuration of periodic CQI reporting on PUSCH," R1-081468, 3GPP TSG RAN WG1 Meeting #52bis, Mar. 2008, XP-050109885, 2 pages.

Panasonic, "Configuration for semi-persistent scheduling," R2-081575, 3GPP TSG RAN WG2 Meeting #61bis, Mar. 2008, XP-050139309, 4 pages.

Texas Instruments, "CQI Reporting on PUSCH", R1-081995, 3GPP TSG RAN WG1 53, May 2008, XP-050110342, 4 pages.

LG Electronics Inc., "Periodic PUSCH Feedback," R1-100219, 3GPP TSG RAN WG1 Meeting #59bis, Jan. 2010, XP-050417911, 3 pages.

Motorola, "Way Forward for CQI Reporting Structure," R1-074047, 3GPP TSG RAN WG1 Meeting #50bis, Oct. 2007, XP-050596511, 4 pages.

* cited by examiner

E-UMTS (a) Control-plane protocol stack (b) User-plane protocol stack

APPARATUS AND METHOD FOR TRANSMITTING UPLINK CONTROL INFORMATION

CROSS-REFERENCE TO RELATED APPLICATIONS

This application is the National Stage filing under 35 U.S.C. 371 of International Application No. PCT/KR2010/006241, filed on Sep. 13, 2010, which claims the benefit of U.S. Provisional Application Ser. No. 61/243,149, filed on Sep. 16, 2009, the contents of which are all incorporated by reference herein in their entirety.

TECHNICAL FIELD

The present invention relates to wireless communication, and more particularly, to a method and apparatus for transmitting uplink control information.

BACKGROUND ART

Wireless communication systems have been diversified in order to provide various types of communication services such as voice or data service. In general, a wireless communication system is a multiple access system capable of sharing available system resources (bandwidth, transmission power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE OF INVENTION

Technical Problem

An object of the present invention devised to solve the problem lies on a method and apparatus for transmitting uplink control information.

Another object of the present invention devised to solve the problem lies on a method and apparatus for efficiently transmitting uplink control information through a Physical Uplink Shared Channel (PUSCH).

Solution to Problem

The object of the present invention can be achieved by providing a method for transmitting uplink control information through a Physical Uplink Shared Channel (PUSCH) at a user equipment in a wireless communication system, the method including: receiving configuration information for periodic PUSCH transmission through a first protocol layer signaling; receiving information indicating activation or deactivation of the periodic PUSCH transmission through a second protocol layer signaling, wherein the second protocol layer is lower than the first protocol layer; and periodically transmitting the uplink control information through the PUSCH according to the configuration information if the periodic PUSCH transmission is activated.

In another aspect of the present invention, provided herein is a user equipment configured to transmit uplink control information through a Physical Uplink Shared Channel (PUSCH) in a wireless communication system, the user equipment including: a Radio Frequency (RF) unit configured to transmit or receive an RF signal to or from a transmitter; and a processor connected to the RF unit and configured to process the signal transmitted or received to or from the transmitter through the RF unit, wherein the processor receives configuration information for periodic PUSCH transmission through a first protocol layer signaling, to receive information indicating activation or deactivation of the periodic PUSCH transmission through a second protocol layer signaling, wherein the second protocol layer is lower than the first protocol layer, and to periodically transmit the uplink control information through the PUSCH according to the configuration information if the periodic PUSCH transmission is activated.

The first protocol layer may include a Radio Resource Control (RRC) layer and the second protocol layer includes a physical layer.

The configuration information may include at least one of a PUSCH transmission interval and a duration of periodic PUSCH transmission.

The configuration information may further include at least one of Resource Block (RB) assignment information and a Modulation and Coding Scheme (MCS) for the periodic PUSCH transmission.

The configuration information may further include identification information indicating that the periodic PUSHC transmission is for the uplink control information.

The configuration information may be received through a Radio Resource Control (RRC) message for Semi-Persistent Scheduling (SPS).

The uplink control information may include Channel State Information (CSI) of a downlink channel.

The CSI may be obtained using a first rank specified by a base station, and the uplink control information may further include information about a second rank preferred by the user equipment.

If initial transmission of the uplink control information fails, the uplink control information may be retransmitted, and an interference and noise signal of the CSI included in the retransmitted uplink control information may be newly computed information.

Advantageous Effects of Invention

According to embodiments of the present invention, it is possible to efficiently transmit a large amount of uplink control information in a ratio communication system.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

The following technologies may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A 3rd Generation Partnership Project Long Term Evolution (3GPP LTE) communication system is part of the E-UMTS (Evolved UMTS), which employs an OFDMA system in downlink and employs an SC-FDMA system in uplink. LTE-A (Advanced) is an evolved version of 3GPP LTE.

In order to clarify the description, the 3GPP LTE/LTE-A will be focused upon, but the technical scope of the present invention is not limited thereto.

Figure 1:
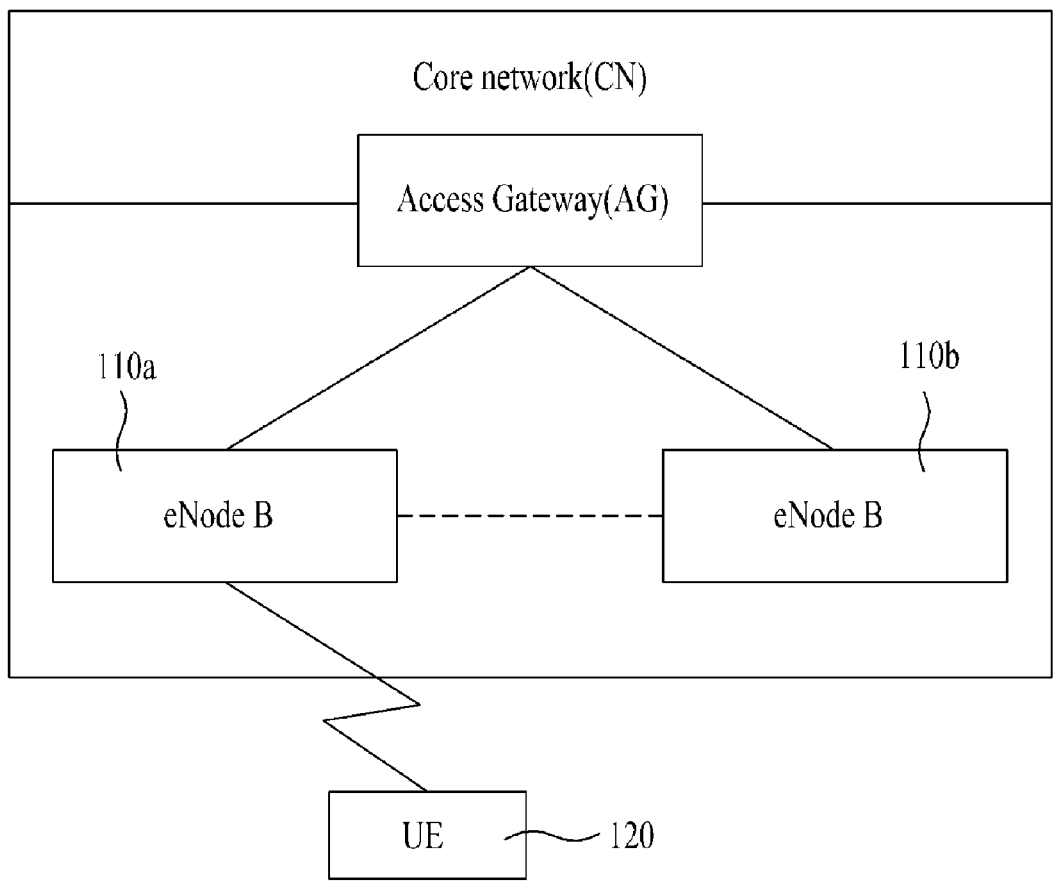
FIG. 1 is a diagram showing a network architecture of an Evolved Universal Mobile Telecommunications System (E-UMTS).

FIG. 1 is a diagram showing a network architecture of an Evolved Universal Mobile Telecommunications System (E-UMTS). The E-UMTS is an evolved version of a WCDMA UMTS and basic standardization thereof is in progress under the 3GPP. The E-UMTS is also referred to as a Long Term Evolution (LTE) system. For details of the technical specifications of the UMTS and the E-UMTS, refer to Release 7 and Release 8 of "3rd Generation Partnership Project; Technical Specification Group Radio Access Network", respectively.

Referring to FIG. 1, the E-UMTS mainly includes a User Equipment (UE) 120, base stations (BSs) (or eNBs or eNode Bs) 110*a* and 110*b,* and an Access Gateway (AG) which is located at an end of a network (E-UTRAN) and which is connected to an external network. Generally, the BS can simultaneously transmit multiple data streams for a broadcast service, a multicast service and/or a unicast service. One or more cells may exist for one BS. The cell provides a downlink or uplink transmission service to several UEs using any one of bandwidths of 1.4, 3, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and request (HARQ) associated information of the data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG and a network node or the like for user registration of the UE. The AG manages mobility of a UE on a Tracking Area (TA) basis. One TA includes a plurality of cells.

Figure 2:
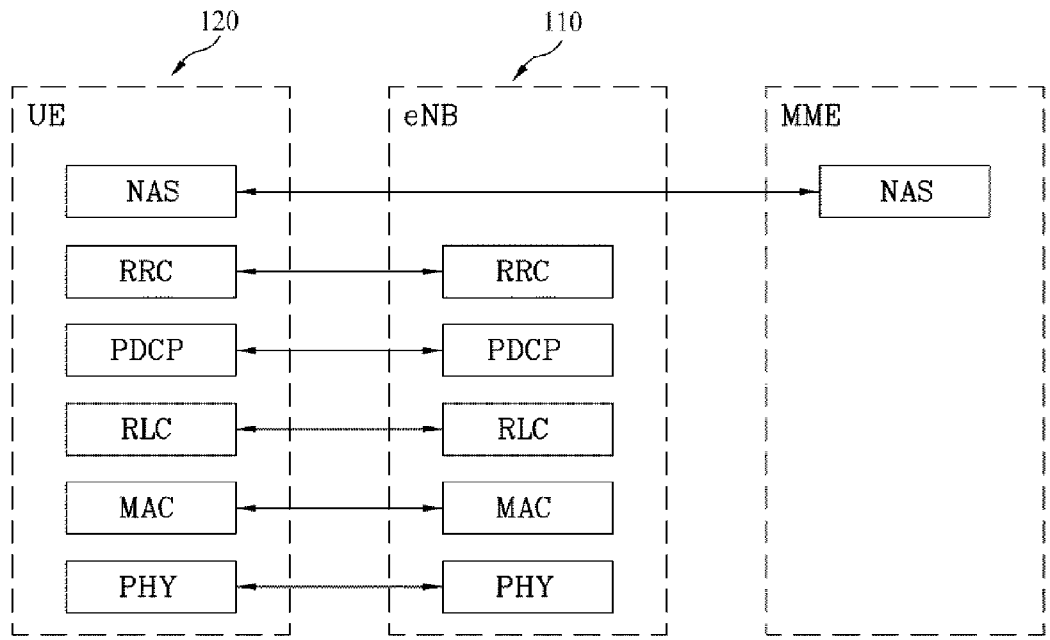
FIG. 2 is a diagram showing a user/control-plane protocol for the E-UMTS.
Figure 2:
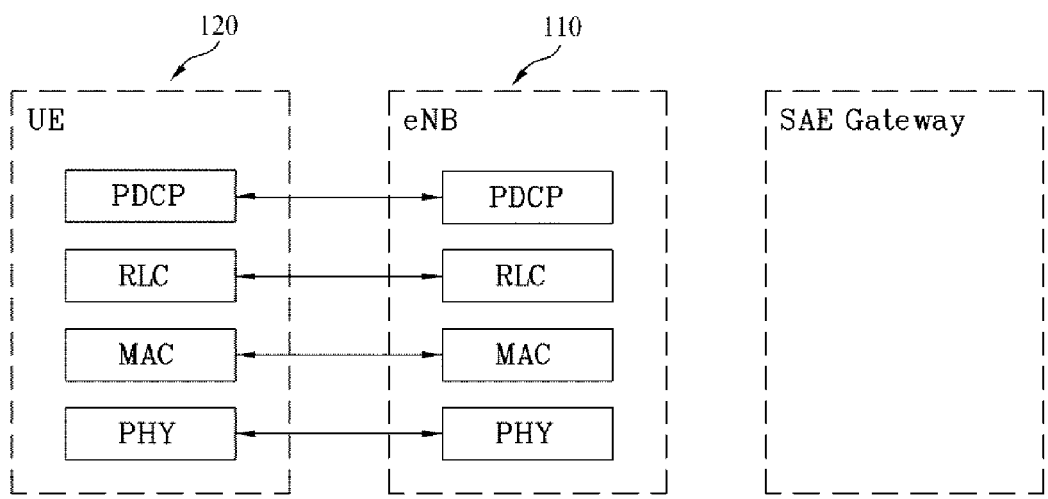

FIG. 2 is a diagram showing a user/control-plane protocol stack for the E-UMTS. Referring to FIG. 2, protocol layers may be divided into a first layer (L1), a second layer (L2) and a third layer (L3) based on the three lower layers of an open system interconnection (OSI) standard model which is well-known in the art of communication systems.

The physical layer PHY, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel.

The MAC layer of the second layer (L2) provides services to a radio link control (RLC) layer, which is a higher layer, via a logical channel. The RLC layer of the second layer (L2) enables reliable data transmission. In the case where the MAC layer performs the RLC function, the RLC layer is included as the functional block of the MAC layer. The PDCP layer of the second layer (L2) performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

A radio resource control (RRC) layer located at the lowest portion of the third layer (L3) is only defined in the control plane and controls logical channels, transport channels and physical channels in relation to the configuration, reconfiguration, and release of the radio bearers (RBs). Here, the RB signifies a service provided by the second layer (L2) for data transmission between the UE 120 and the E-UTRAN.

Figure 3:
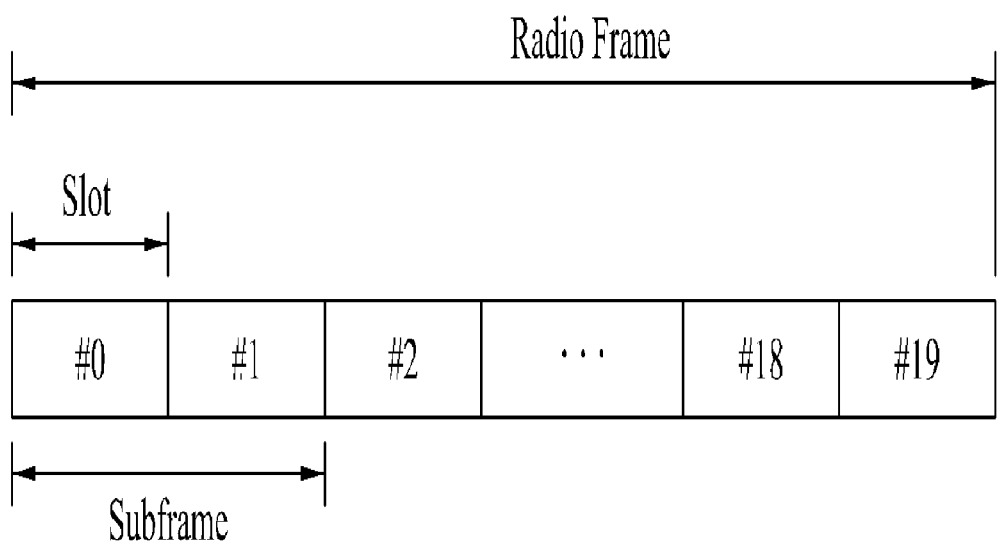
FIG. 3 is a diagram showing the structure of a radio frame used in the E-UMTS.

FIG. 3 is a diagram showing the structure of a radio frame used in the E-UMTS.

Referring to FIG. 3, the E-UTMS uses a 10 ms radio frame and one radio frame includes 10 subframes. In addition, one subframe includes two continuous slots. The length of one slot is 0.5 ms. In addition, the slot includes a plurality of symbols (e.g., OFDM symbols or SC-FDMA symbols).

Figure 4:
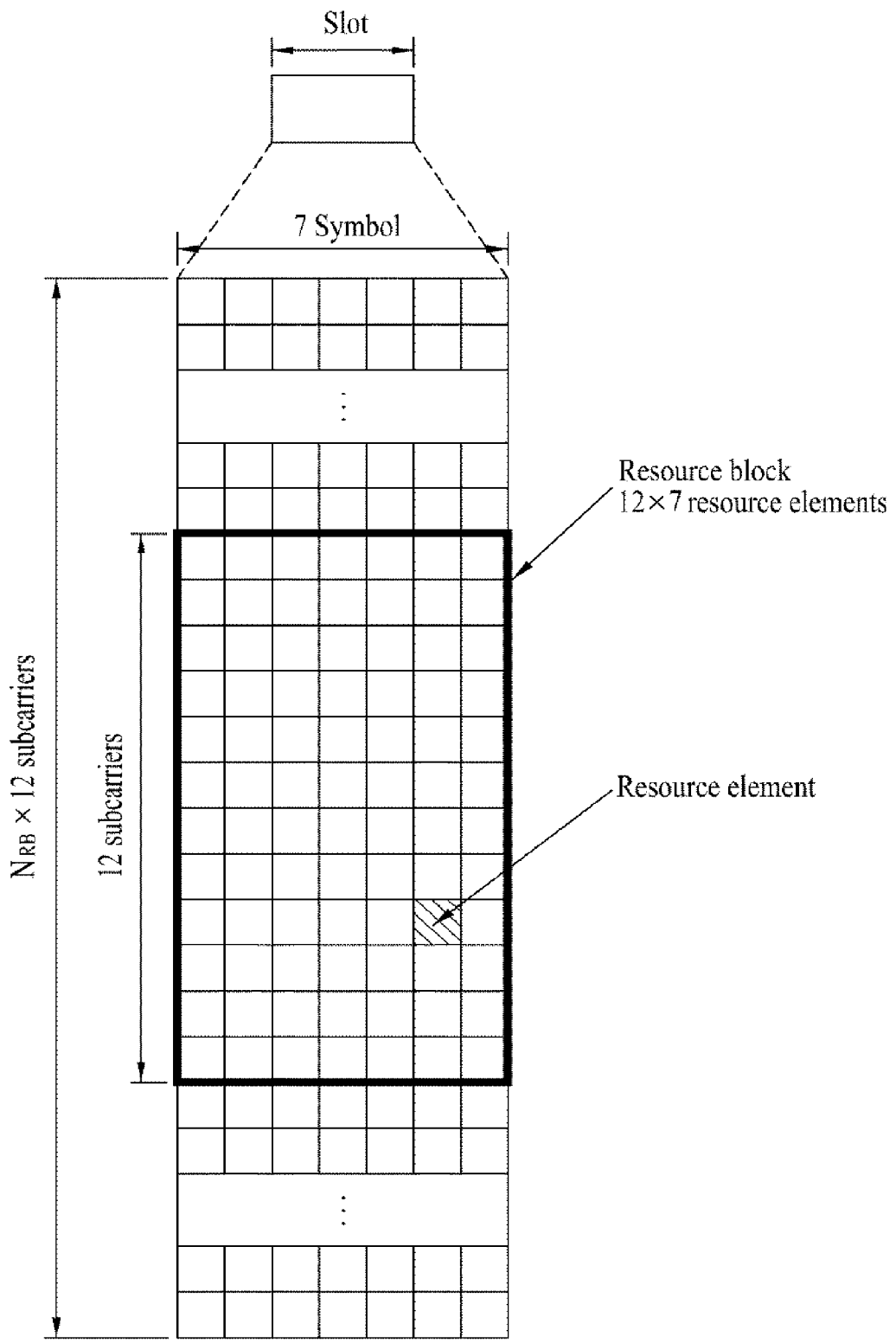
FIG. 4 is a diagram showing a resource grid of a radio frame.

FIG. 4 is a diagram showing a resource grid for a time slot.

Referring to FIG. 4, the time slot includes a plurality of OFDM symbols or SC-FDMA symbols and includes a plurality of Resource Blocks (RBs) in a frequency domain. One RB includes 12×7(6) resource elements. The number of RBs included in the time slot depends on frequency bandwidth set in a cell. Each column of the resource grid indicates minimum resource defined by one symbol and one subcarrier and is referred to as a Resource Element (RE). Although the time slot includes 7 symbols and the RB includes 12 subcarriers, in FIG. 4, the present invention is not limited thereto. For example, the number of symbols included in the time slot may be changed according to the length of a Cyclic Prefix (CP).

Figure 5:
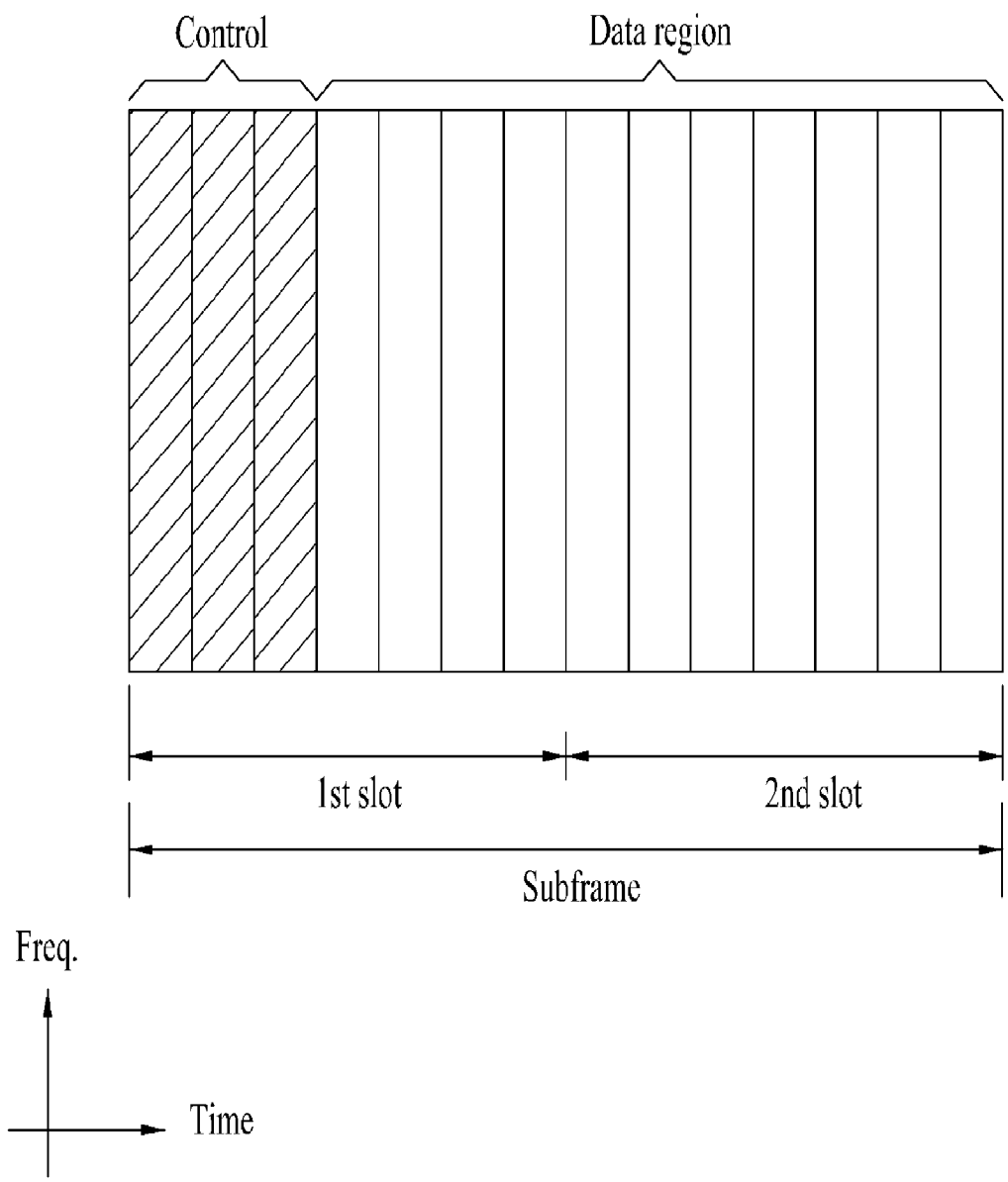
FIG. 5 is a diagram showing the structure of a downlink subframe.

FIG. 5 is a diagram showing the structure of a downlink subframe.

Referring to FIG. 5, in a downlink subframe of an LTE system, an L1/L2 control region and a data region are multiplexed using a Time Division Multiplexing (TDM) method. The L1/L2 control region includes n (e.g., 3 or 4) first OFDM symbols of the subframe and the remaining OFDM symbols are used in the data region. The L1/L2 control region includes a Physical Downlink Control Channel (PDCCH) for carrying downlink control information and the data region includes a Physical Downlink Shared Channel (PDSCH) which is a downlink data channel. In order to receive a downlink signal, a User Equipment (UE) reads downlink scheduling information from the PDCCH and receives downlink data on the PDSCH using resource assignment information indicated by the downlink scheduling information. Resources (that is, PDSCH) scheduled to the UE are assigned in units of resource blocks or resource block groups.

The PDCCH informs the UE of information associated with resource assignment of a Paging Channel (PCH) and a Downlink-Shared Channel (DL-SCH), both of which are transfer channels, uplink scheduling grant, HARQ information and the like. Information transmitted through the PDCCH is generically called Downlink Control Information (DCI). The PDCCH has a format which varies according to information. The DCI format is changed according to control information. Table 1 shows a DCI format 0 for uplink scheduling.

TABLE 1

| Field | Bits | Comment |
| --- | --- | --- |
| Format | 1 | Uplink grant or downlink assignment |
| Hopping flag | 1 | Frequency hopping on/off |
| RB assignment | 7 | Resource block assigned for PUSCH |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | Request CQI feedback through PUSCH |
| RNTI/CRC | 16 | 16 bit RNTI implicitly encoded in CRC |
| Padding | 1 | Ensure format 0 matches format 1A in size |
| Total | 38 | |

* MCS: Modulation and Coding Scheme
* TPC: Transmit Power Control
* RNTI: Radio Network Temporary Identifier
* CRC: Cyclic Redundancy Check The UE to which the PDCCH is transmitted is identified using the RNTI. For example, it is assumed that a PDCCH is CRC-masked with an RNTI "A" and uplink radio resource assignment information "B" (e.g., frequency location) and transmission format information "C" (e.g., a transmission block size, modulation, coding information or the like) are transmitted. In this case, UEs located in a cell monitor the PDCCH using RNTI information and a specific UE with RNTI "A" performs uplink transmission according to information about B and C obtained from the PDCCH.

Figure 6:
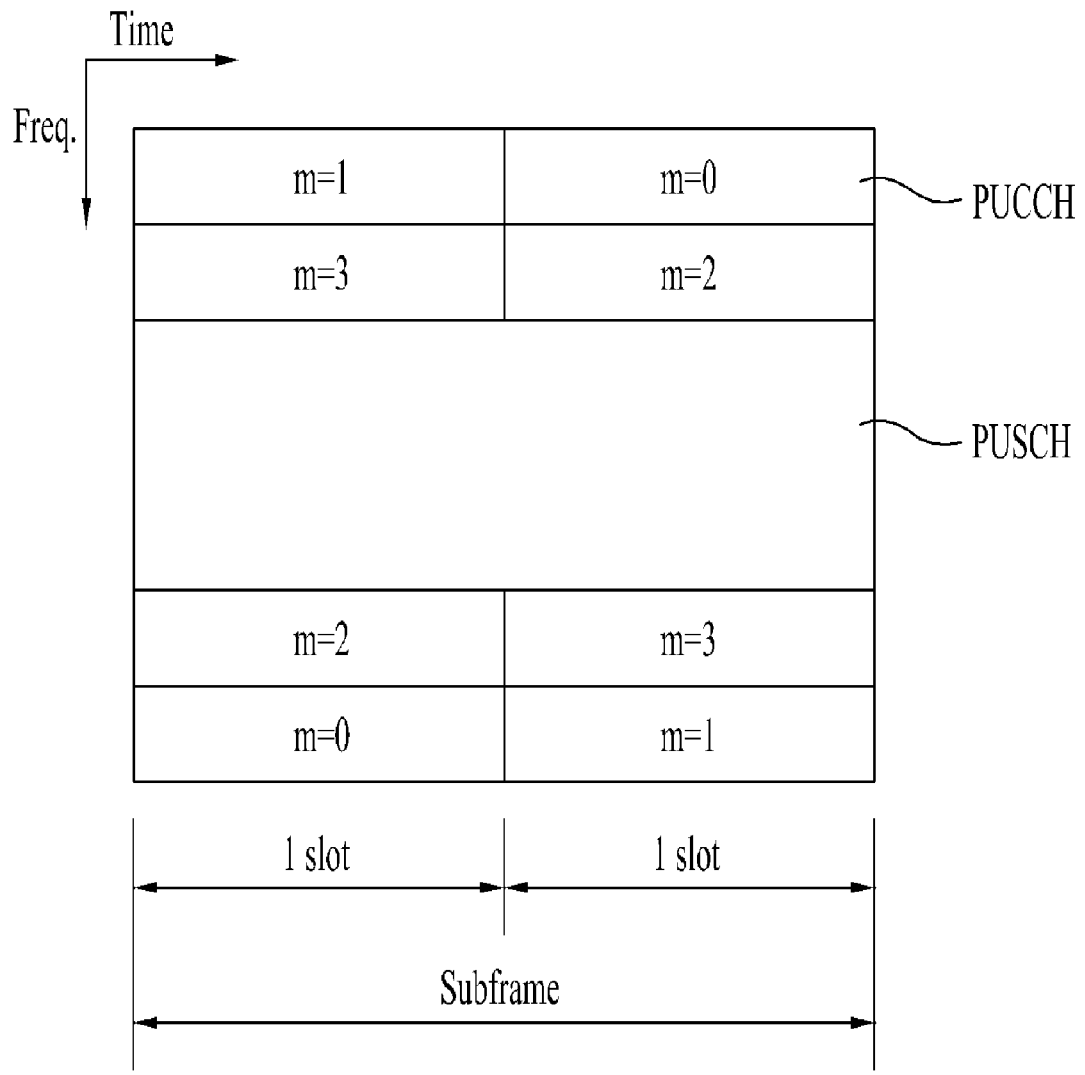
FIG. 6 is a diagram showing the structure of an uplink subframe.

FIG. 6 is a diagram showing the structure of an uplink subframe used in the LTE system.

Referring to FIG. 6, the uplink subframe includes a plurality of slots (e.g., 2). Each slot may include different numbers of SC-FDMA symbols according to the length of the CP. The uplink subframe is divided into a data region and a control region in a frequency domain. The data region includes a PUSCH and is used to transmit a data signal such as voice. The control region includes a PUCCH and is used to transmit uplink control information. The PUCCH includes RB pairs located at both ends of the data region on a frequency axis and hops between slots. The uplink control information includes a Scheduling Request (SR) for requesting uplink transfer resources, HARQ Acknowledgement (ACK)/Negative ACK (NACK) for downlink data, downlink channel (state) information and the like. The downlink channel (state) information includes a Precoding Matrix Indicator (PMI), a Rank Indicator (RI) and a Channel Quality Indicator (CQI).

HARQ

In a wireless communication system, if plural UEs having data to be transmitted in uplink/downlink are present, a BS selects which UE will transmit data in each Transmission Time Interval (TTI) (e.g., subframe). In particular, in a system operated using multiple carriers and the like, a BS selects UEs which will transmit data in uplink/downlink in each TTI and selects a frequency band used when each UE transmits the data.

In uplink, UEs transmit reference signals (or pilots) and a BS checks channel states of the UEs using the reference signals transmitted from the UEs and selects UEs which will transmit data in uplink in each unit frequency band. The BS informs the UEs of the selected results. That is, the base station transmits, to a UE which is scheduled to perform uplink transmission in a specific TTI, an uplink assignment message enabling the UE to transmit data using a specific frequency band. The uplink assignment message is also called UL grant. The UE transmits data in uplink in response to the uplink assignment message. The uplink assignment message includes information about a UE Identity (ID), RB assignment information, a payload or the like, and may further include an Incremental Redundancy (IR) version, a New Data Indication (NDI), and the like.

In the case where a synchronous non-adaptive HARQ scheme is applied, when a UE allotted a specific time retransmits data, a retransmission time is systematically decided in advance (e.g., after four subframes from a NACK reception time). Accordingly, a UL grant message transmitted from a BS to a UE is only transmitted upon initial transmission and retransmission is performed by an ACK/NACK signal. In contrast, in the case where an asynchronous HARQ scheme is applied, since a retransmission time is not decided in advance, a BS should transmit a retransmission request message to a UE. In addition, since frequency resources or MCS for retransmission is changed according to a transmission time, when a BS transmits a retransmission request message, a HARQ process index, an IR version and NDI information should be transmitted in addition to a UE ID, RB assignment information and a payload.

Figure 7:
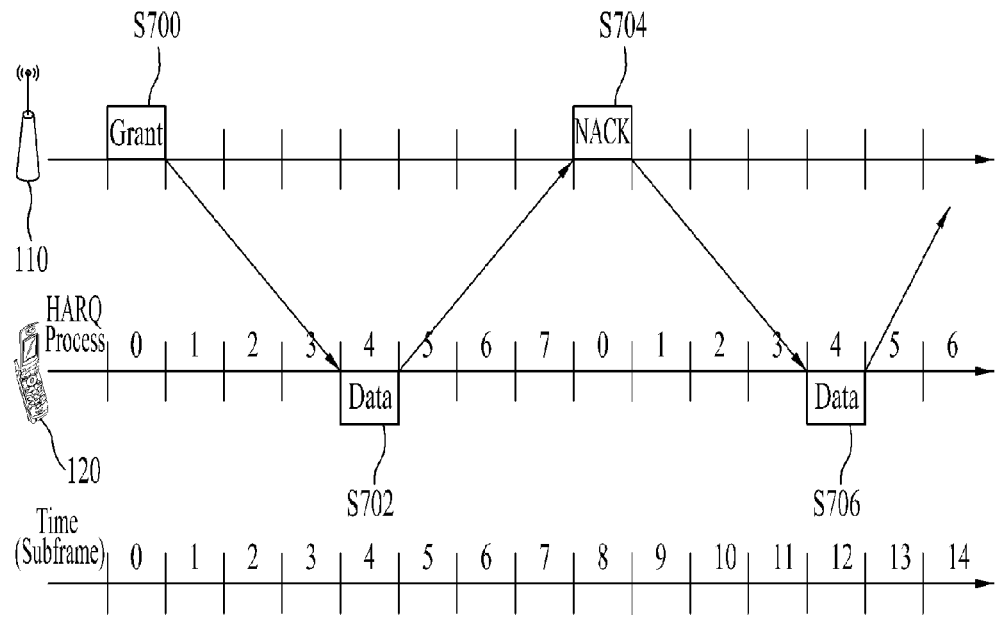
FIG. 7 is a diagram showing an Uplink Hybrid Automatic Repeat request (UL HARQ) operation in a Long Term Evolution (LTE) system.

FIG. 7 is a diagram showing an Uplink Hybrid Automatic Repeat request (UL HARQ) operation in a Long Term Evolution (LTE) system. In the LTE system, a UL HARQ scheme uses a synchronous non-adaptive HARQ scheme. When using 8-channel HARQ, HARQ process numbers are 0 to 7. One HARQ process operates per TTI (e.g., subframe). Referring to FIG. 7, a BS 110 transmits UL grant to a UE 120 through a PDCCH (S700). The UE 120 transmits uplink data to the BS 110 using an RB and MCS specified by the UL grant four subframes (e.g., subframe 4) after the UL grant is received (e.g., subframe 0) (S702). The BS 110 decodes the uplink data received from the UE 120 and then generates an ACK/NACK signal. If decoding of the uplink data fails, the BS 110 transmits a NACK signal to the UE 120 (704). The UE 120 retransmits the uplink data four subframes after a NACK is received (S706). The initial transmission and retransmission of the uplink data are performed by the same HARQ processor (e.g. HARQ process 4).

Semi-Persistent Scheduling (SPS)

Scheduling dynamically assigns resources to general unicast data on a per subframe basis. In contrast, SPS is a scheme for reserving resources in advance with respect to traffic which is periodically generated at a medium/low data request rate, such as Voice over Internet Protocol (VoIP) or streaming. In the SPS, resources are reserved in advance with respect to specific traffic such that scheduling overhead is reduced and resources are stably assigned.

In the LTE system, in the case of DL/UL SPS, information about a subframe for performing SPS transmission (Tx)/reception (Rx) is obtained by RRC signaling, and SPS activation (or reactivation) and deactivation are performed through a PDCCH. Subframe information for the SPS includes a subframe interval and a subframe offset. For convenience, a PDCCH indicating SPS activation/deactivation is called an SPS PDCCH. The SPS PDCCH carries RB assignment information for SPS Tx/Rx and Modulation and Coding Scheme (MCS) information. In addition, the Cyclic-Re-dundancy-Check (CRC) of the SPS PDCCH is masked with an SPS Radio Network Temporary Identifier (RNTI). Accordingly, even when information about a subframe for receiving the SPS by RRC signaling is assigned, the UE does not immediately perform the SPS Tx/Rx. When the UE receives an SPS PDCCH indicating activation (or reactivation), the SPS Tx/Rx is performed in a subframe assigned by RRC signaling. The SPS Tx/Rx is performed within the subframe using the RB assignment information and the MCS information in the SPS PDCCH. Meanwhile, the UE stops the SPS Tx/Rx when receiving a PDCCH indicating deactivation. When an SPS PDCCH indicating activation (or reactivation) is received, the stopped SPS Tx/Rx is resumed in the subframe assigned by the RRC signaling using the RB assignment information and the MCS information specified in the SPS PDCCH.

Figure 8:
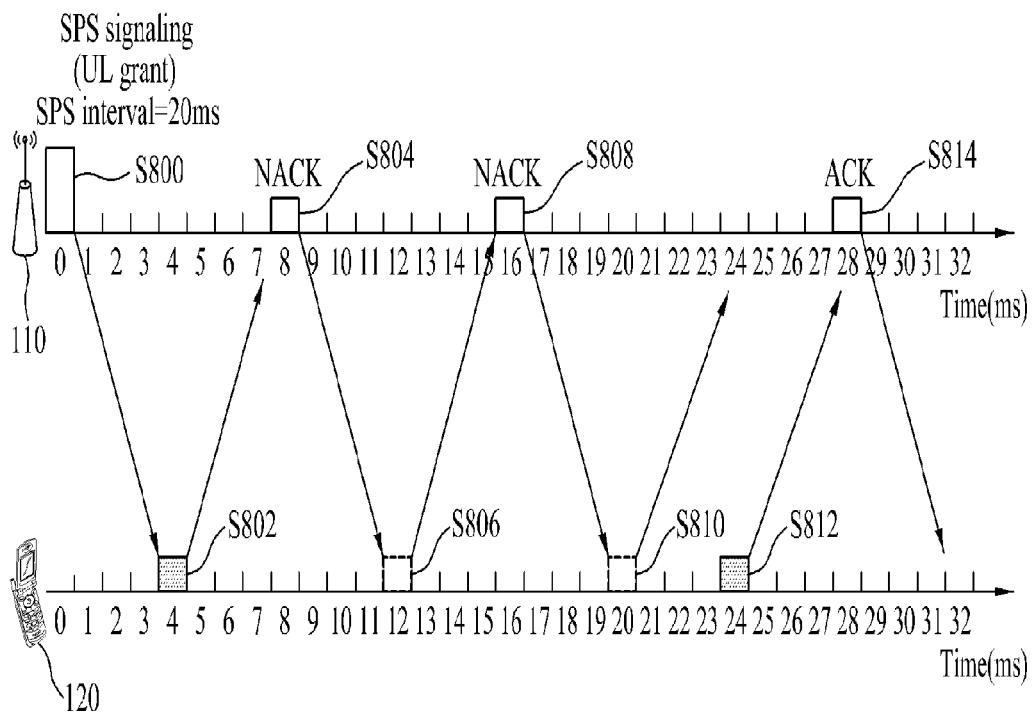
FIG. 8 is a diagram showing an uplink Semi-Persistent Scheduling (SPS) operating scheme.

FIG. 8 is a diagram showing an uplink Semi-Persistent Scheduling (SPS) operating scheme. In this example, it is assumed that a resource assignment interval of the SPS is set to 20 ms through higher layer (e.g., RRC) signaling.

Referring to FIG. 8, a BS 110 transmits an SPS PDCCH indicating SPS activation to a UE 120 (S800). In this example, the SPS PDCCH includes UL grant information. In this case, a specific RB specified by the SPS PDCCH is assigned to the UE 120 for uplink transmission at an interval of 20 ms after the UL grant information is received by SPS signaling. Accordingly, the UE 120 may perform uplink transmission using the RB information and the MCS information specified by the SPS PDCCH at an interval of 20 ms (S802 and S812). In contrast, in case of using a UL synchronous HARQ scheme, resource for retransmission is reserved at an interval of 8 ms after initial transmission (S806 and S810). In detail, the UE 120 performs retransmission through resources reserved for HARQ retransmission (S806 and S810) when receiving a NACK signal with respect to the uplink data (S804 and S808). In contrast, if the initial transmission of the UE 120 succeeds, that is, if an ACK signal is received with respect to the uplink data (S814), resources reserved for HARQ retransmission may be used for another UE.

Reference Signal (RS)

In a wireless communication system, since packets are transmitted through a radio channel, a signal may be distorted during transmission. In order to enable a reception side to correctly receive the distorted signal, distortion of the received signal should be corrected using channel information (or channel state information). In order to detect the channel information, a method of transmitting a signal which is known to both the transmission side and the reception side and detecting channel information using a distortion degree when the signal is received through a channel is mainly used. The signal known to both the transmission side and the reception side is referred to as a pilot signal or a reference signal (RS). When transmitting or receiving data using multiple antennas, the channel states between the transmission antennas and the reception antennas should be detected in order to correctly receive the signal. Accordingly, each transmission antenna has an individual RS.

In the wireless communication system, the RS may be divided into two signals according to use thereof: an RS used to acquire channel information (channel measurement RS) and an RS used to demodulate data (demodulation RS). For convenience, a downlink RS will be focused upon. Since the channel measurement RS is used to acquire downlink channel information, the channel measurement RS is transmitted over the entire band. In addition, even a UE which does not receive downlink data in a specific subframe should receive and measure the channel measurement RS. In addition, the channel measurement RS is used to measure handover or the like. Meanwhile, the demodulation RS indicates an RS which is sent through resource together when the BS transmits downlink data. When the UE receives the demodulation RS, a channel through which data is transmitted may be estimated and thus the data is demodulated.

In the LTE system, two kinds of downlink RSs are defined for a unicast service: a Common RS (CRS) for acquiring channel state information and measuring handover or the like and a UE-specific RS for data demodulation. The UE-specific RS is also called a dedicated RS. In the LTE system, the UE-specific RS is used only for data demodulation and the CRS is used both for channel information acquisition and data demodulation. The CRS is a cell-specific signal and is transmitted on a per subframe basis through the entire band.

Figure 9:
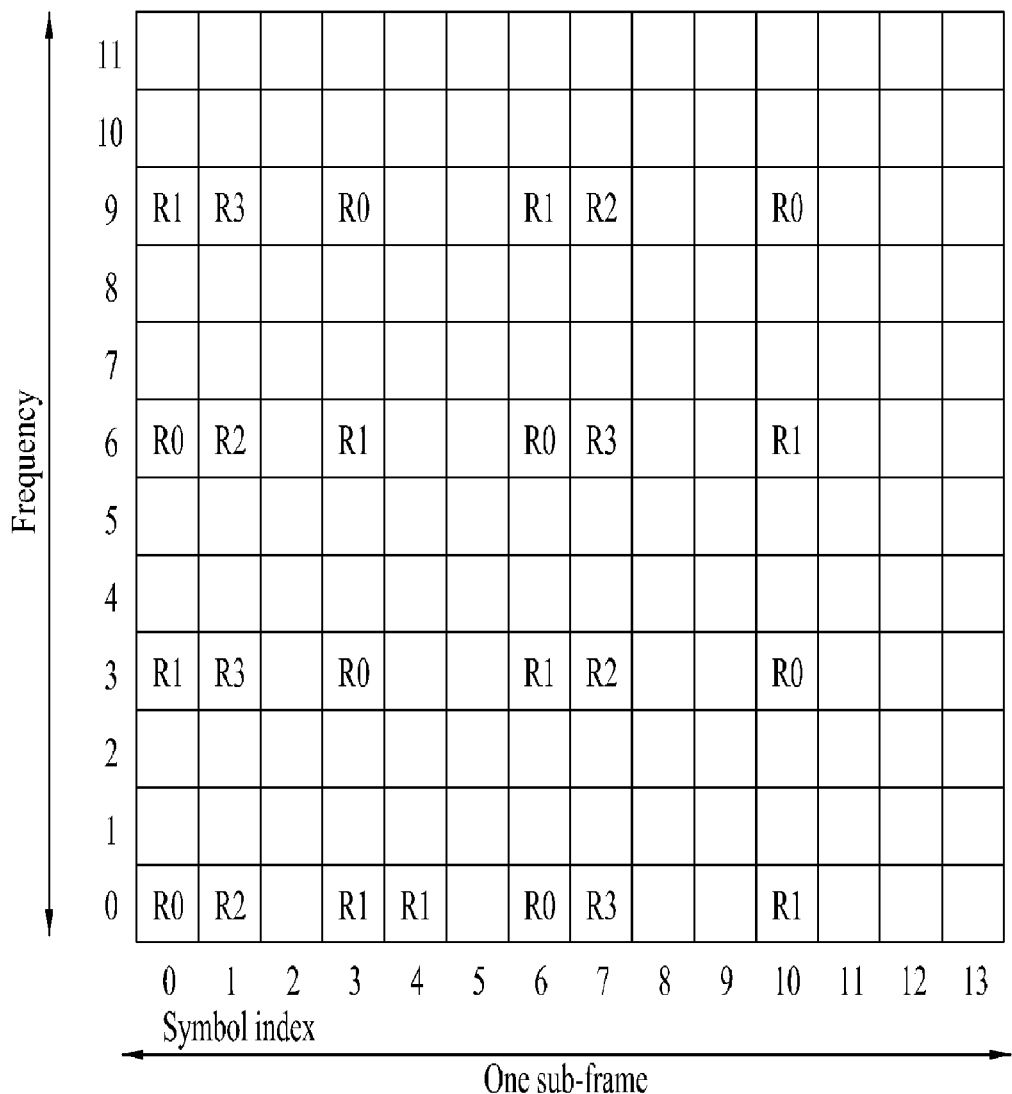
FIG. 9 is a diagram showing a Common Reference Signal (CRS) pattern of an LTE system.

FIG. 9 is a diagram showing a Common Reference Signal (CRS) pattern of an LTE system. FIG. 9 shows the CRS pattern in RBs. In the LTE system, a downlink RS is defined on a per antenna port basis.

Referring to FIG. 9, since the LTE system supports a maximum of four transmission antennas in downlink, CRSs for a maximum of four antenna ports may be transmitted according to the number of transmission antennas of a BS. For example, if the number of transmission antennas of the BS is two, CRSs for antenna ports 0 and 1 are transmitted and, if the number of transmission antennas is four, CRSs for antenna ports 0 to 3 are transmitted. The respective CRSs for the antenna ports are multiplexed within RBs using a Frequency Division Multiplexing (FDM) method.

An LTE-A system, an evolved form of the LTE system, supports a maximum of eight transmission antennas in downlink. Accordingly, RSs for a maximum of eight transmission antennas should be supported. Since only RSs for a maximum of four antenna ports are defined as downlink RSs in the LTE system, if a BS has four to eight downlink transmission antennas in the LTE-A system, RSs for the antennas should be additionally defined. Channel measurement RSs and demodulation RSs should be designed as the RSs for a maximum of eight transmission antenna ports.

One important consideration in design of the LTE-A system is backward compatibility. That is, an LTE UE should operate well even in the LTE-A system and the LTE-A system should support the LTE UE. In terms of RS transmission, in a time-frequency domain in which CRSs defined in the LTE system are transmitted, RSs for a maximum of eight transmission antenna ports should be additionally defined. However, if an RS pattern for a maximum of eight transmission antennas is added to the entire band per subframe using the same method as the existing CRS of the LTE system, RS overhead is excessively increased in the LTE-A system. Accordingly, RSs newly designed in the LTE-A system are roughly divided into two types: a channel measurement RS for selecting an MCS, a Precoding Matrix Indicator (PMI) or the like (Channel State Information RS, Channel State Indication RS (CSI-RS), etc.) and a Data Demodulation RS (DM-RS). The CSI-RS is used for channel measurement, whereas the existing CRS is used for channel measurement or handover measurement. The CSI-RS may also be used for handover measurement. Since the CSI-RS is transmitted to acquire a channel state, the CSI-RS need not be transmitted per subframe, unlike the existing LTE CRS. Accordingly, the CSI-RS may be intermittently transmitted on a time axis in order to reduce overhead. For example, the CSI-RS may be periodically transmitted with a period which is an integral multiple of one subframe or may be transmitted with a specific transmission pattern. The transmission period or pattern of the CSI-RS may be configured by a BS. In order to measure the CSI-RS, a UE should determine information regarding a time-frequency location of the CSI-RS, CSI-RS sequence, and CSI-RS frequency shift for each antenna port of a cell to which the UE belongs. In contrast, the DM-RS is dedicatedly transmitted to a UE scheduled in a time-frequency domain for data demodulation. That is, the DM-RS for a specific UE is transmitted only in a region to which the UE is scheduled, that is, in a time-frequency domain in which data is received.

Cooperative Multipoint Transmission/Reception (CoMP) Method

Future systems, after the LTE-A system, will employ a method for enabling cooperation among several cells so as to improve performance. Such a mode is called Cooperative Multipoint Transmission/Reception (CoMP). The CoMP method indicates a method for enabling two or more BSs, access points or cells to cooperate with each other so as to communicate with a UE, in order to more smoothly perform communication between a specific UE and a BS, an access point or a cell. In the present invention, BS, access point and cell have the same meaning.

Figure 10:
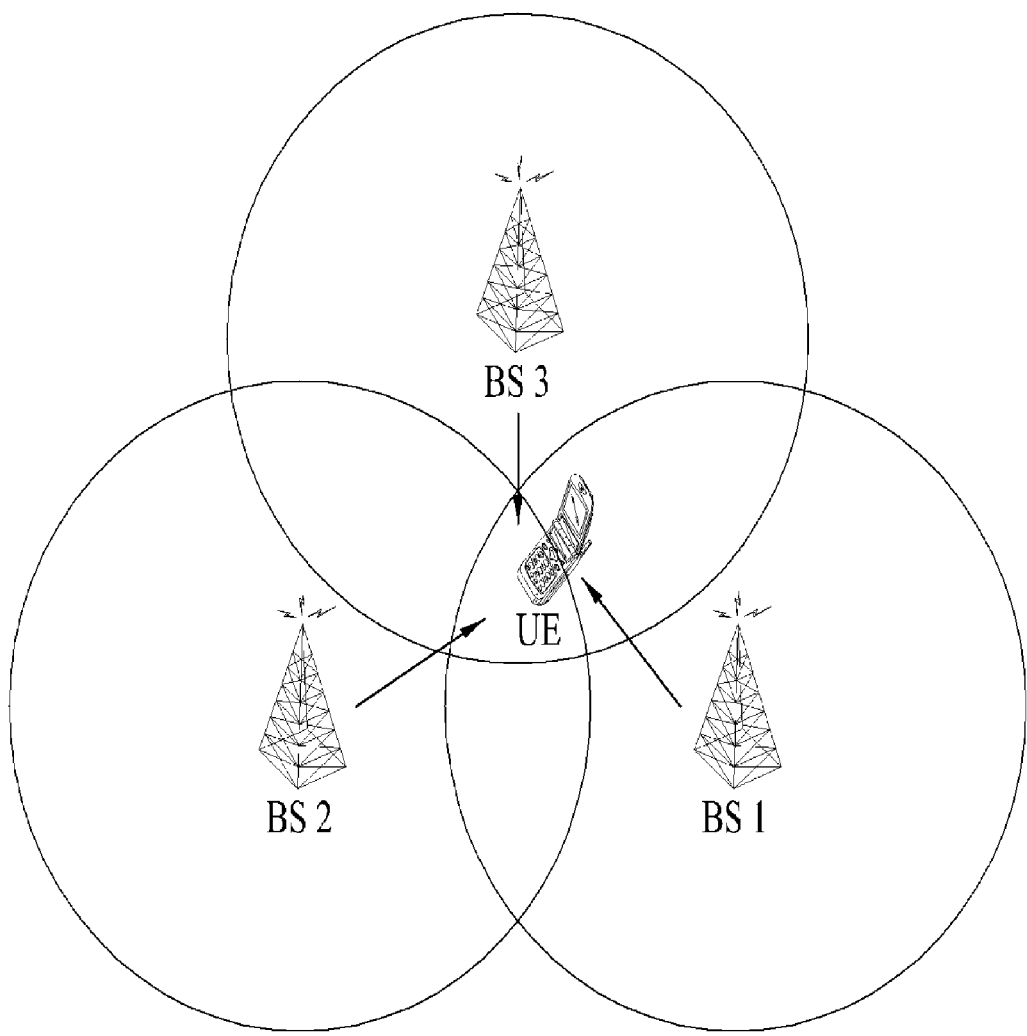
FIG. 10 is a diagram showing an example of performing Cooperative Multipoint Transmission/Reception (CoMP).

FIG. 10 is a diagram showing an example of performing CoMP. Referring to FIG. 10, a wireless communication system includes a plurality of base stations BS1, BS2 and BS3 for performing the CoMP and a UE. The plurality of base stations BS1, BS2 and BS3 for performing the CoMP may cooperate with each other so as to efficiently transmit data to the UE. The CoMP may be roughly divided into two types depending on whether or not data is transmitted from each base station for performing the CoMP: Joint Processing (CoMP Joint Processing (CoMP-JP) and Cooperative scheduling/beamforming (CoMP-CS)).

In the CoMP-JP, data transmitted to one UE is simultaneously transmitted from the base stations, which perform the CoMP, to the UE and the UE couples the signals from the base stations so as to improve reception performance. In contrast, in the CoMP-CS, data transmitted to one UE is transmitted through one base station at a certain instant and scheduling or beamforming is performed such that interference with another base station is minimized.

Carrier Aggregation (CA)

The LTE-A system uses carrier aggregation or bandwidth aggregation technology using an uplink/downlink bandwidth greater than that of a plurality of uplink/downlink frequency blocks in order to use a wider frequency band. Each frequency block is transmitted using a Component Carrier (CC). In the present specification, the CC may be a frequency block and/or a central carrier of a frequency block for carrier aggregation according to context.

Figure 11:
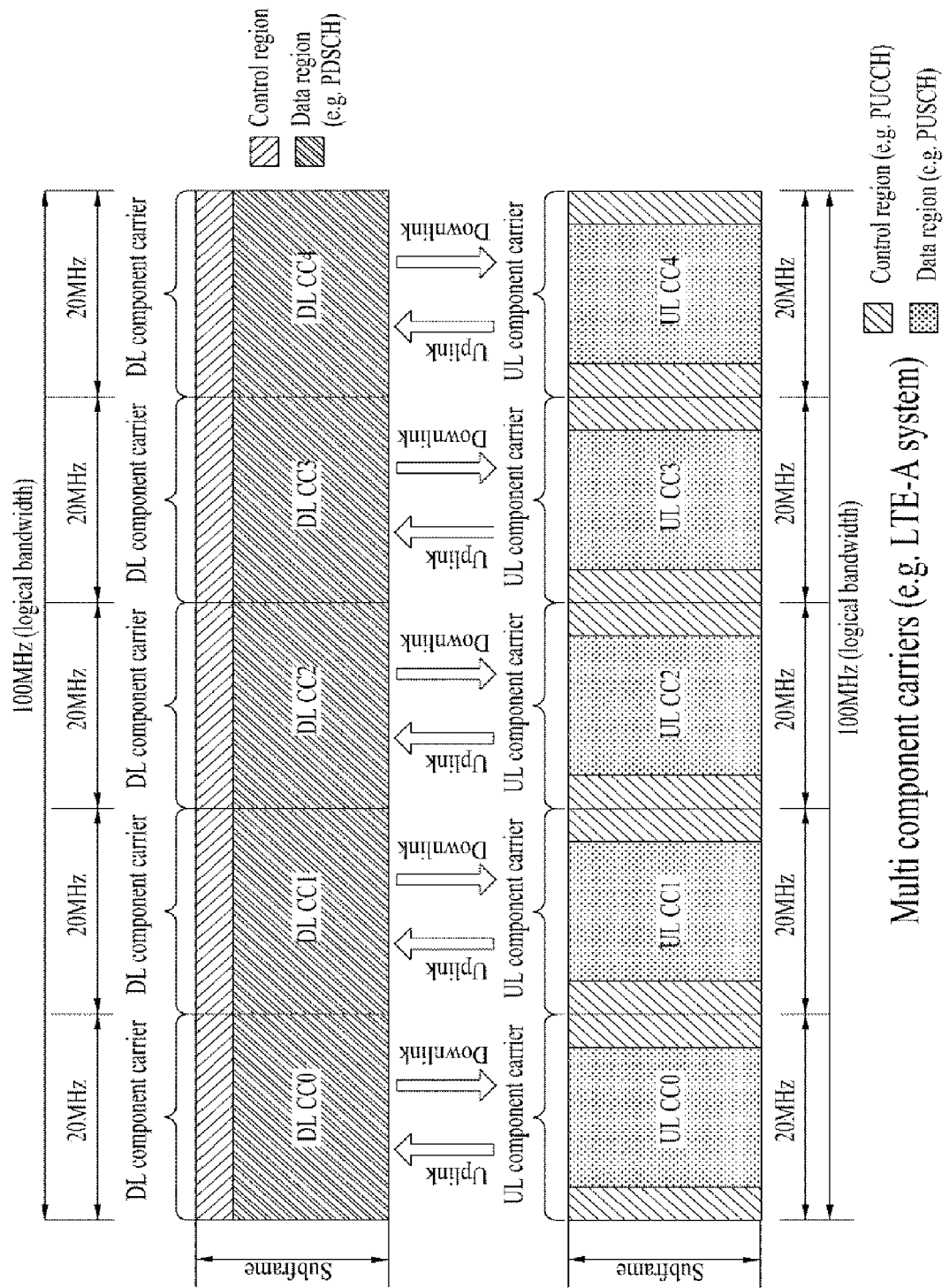
FIG. 11 is a diagram showing an example of performing communication given multiple component carriers.

FIG. 11 is a diagram showing an example of performing communication given multiple component carriers. FIG. 11 may correspond to a communication example of an LTE-A system.

Referring to FIG. 11, five 20-MHz CCs may be aggregated so as to support a bandwidth of 100 MHz in uplink/downlink. CCs may be contiguous or non-contiguous in a frequency domain. FIG. 11 shows the case where the bandwidth of an uplink CC and the bandwidth of a downlink CC are equal and symmetrical, for convenience. However, the bandwidths of the CCs may be independently set. In addition, asymmetrical carrier aggregation in which the number of uplink CCs and the number of downlink CCs are different is possible. The asymmetrical carrier aggregation may occur due to limited availability of frequency bands or may be artificially generated by network configuration. For example, although the entire band of the system includes N CCs, a frequency band in which a specific UE performs reception may be limited to M (<N) CCs. Various parameters for carrier aggregation may be set using a cell-specific method, a UE group-specific method or a UE-specific method.

Although FIG. 11 shows the case where uplink signals and downlink signals are transmitted through one-to-one mapped CCs, CCs over which signals are actually transmitted may be changed according to network configuration or signal type. For example, if a scheduling command is transmitted in downlink through a DL CCL1, data transmitted according to a scheduling command may be transmitted through another DL CC or UL CC. In addition, uplink control information may be transmitted in uplink through a specific UL CC regardless of whether or not mapping between CCs is performed. Similarly, downlink control information may be transmitted through a specific DL CC.

Figure 12:
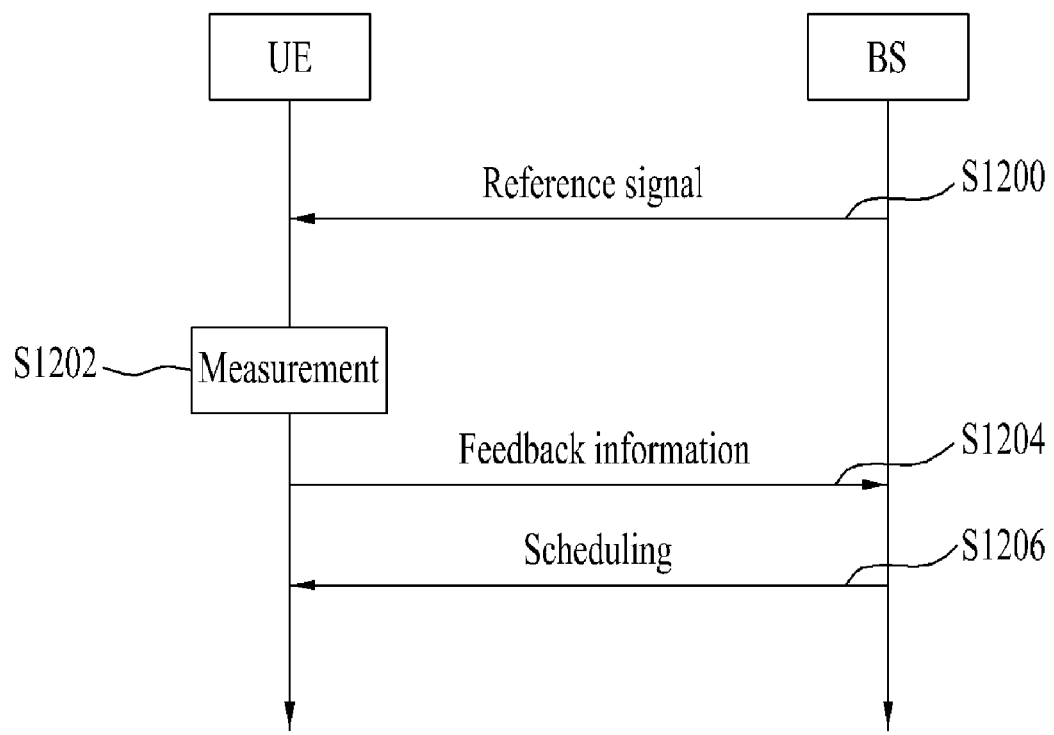
FIG. 12 is a diagram showing a downlink scheduling procedure.

FIG. 12 is a diagram showing a downlink scheduling procedure.

Referring to FIG. 12, a BS transmits an RS to a UE (S1200). The RS includes a channel measurement RS, for example, a CRS or a CSI-RS. The UE performs channel measurement using the RS received from the BS (S1202). Thereafter, the UE feeds back downlink channel information computed through channel measurement to the BS (S1204). The channel information fed back from the UE to the BS includes a covariance matrix of a channel, an interference and noise signal level (e.g., a signal-to-noise ratio (SNR), a signal-to-interference-plus-noise ratio (SINR), a carrier-to-interference-plus-noise ratio (CINR), or the like), channel direction information, a Precoding Matrix Indicator (PMI), a Rank Indicator (RI), a Channel Quality Indicator (CQI), a Received Signal Strength Indicator (RSSI), a Reference Signal Received Quality (RSRQ), and the like. Thereafter, the BS may perform downlink scheduling with respect to the UE using the downlink channel information received through the feedback information (S1206).

While a CoMP method, an (asymmetrical) CA method or a MIMO method supporting eight downlink transmission antennas has been introduced into the LTE-A system, the amount of uplink control information supporting these methods is rapidly increased. For example, in the CoMP, a UE which performs the CoMP should measure a CSI-RS of a cooperative neighboring cell as well as a serving cell thereof and send feedback information associated therewith to a BS. However, in the feedback structure defined in the LTE system, a larger amount of control information cannot be reported in uplink. Accordingly, there is a need for a new uplink control information feedback method.

In order to solve such a problem, a method of transmitting a larger amount of control information in uplink by transmitting uplink control information in a PUSCH region may be considered. However, scheduling should be performed in order to transmit information through a PUSCH. However, if scheduling is always performed whenever control information is transmitted, overhead is increased. Accordingly, the present invention proposes a method of reserving a specific time-frequency resource region in advance without always performing scheduling whenever uplink control information is periodically transmitted. For convenience, periodic transmission of uplink control in-formation through a PUSCH according to the present invention is called a periodic PUSCH feedback or simply a PUSCH feedback.

Hereinafter, a detailed method of performing periodic PUSCH feedback will be described with reference to the drawings.

Embodiment 1: Periodic PUSCH Feedback Using Higher Layer Signaling

Figure 13:
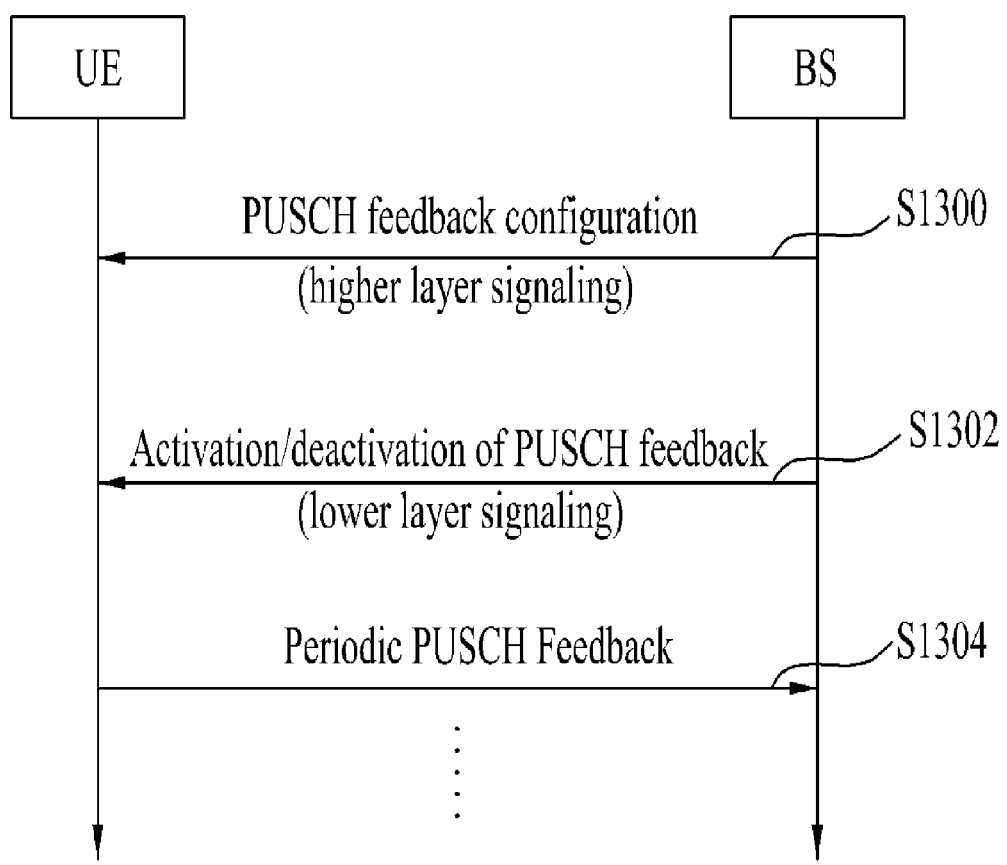
FIGS. 13 to 16 are diagrams showing an example of performing periodic Physical Uplink Shared Channel (PUSCH) feedback according to an embodiment of the present invention.

FIG. 13 shows an example of performing a periodic PUSCH feedback according to an embodiment of the present invention. The present embodiment proposes a method of informing configuration information of periodic PUSCH transmission through higher layer signaling and activating or deactivating the periodic PUSCH transmission through lower layer signaling.

Referring to FIG. 13, a BS transmits PUSCH feedback configuration information to a UE through higher layer signaling (S1300). The higher layer signaling includes, but is not limited to, RRC signaling. The PUSCH feedback configuration information includes a variety of information for periodic PUSCH transmission.

For example, the PUSCH feedback configuration information may include a PUSCH feedback transmission interval or cycle. The PUSCH feedback transmission interval indicates an interval or cycle during which PUSCH feedback is performed. For example, PUSCH feedback configuration information indicates an interval or cycle of a PUSCH transmission subframe. The PUSCH feedback transmission interval may be defined in subframe (group) units or time units (e.g., 1 ms) corresponding thereto.

In addition, the PUSCH feedback configuration information may include a PUSCH feedback transmission duration. The PUSCH feedback transmission duration indicates a time when the periodic PUSCH feedback transmission is valid. Since a PUSCH feedback transmission end time can be determined through the PUSCH feedback transmission duration, if the PUSCH feedback transmission duration is included in the PUSCH feedback configuration information, lower layer signaling is enough to indicates only activation of the PUSCH feedback transmission.

In addition, the PUSCH feedback configuration information may include a portion of UL grant information for the PUSCH feedback. For example, the PUSCH feedback configuration information may include at least a portion of RB assignment information and MCS information. If the PUSCH feedback is activated/deactivated using the DCI format of the existing LTE system, the existing DCI format may not have space for additional indication information. Accordingly, a portion of information included in the existing DCI format may be indicated by higher layer signaling and indication information about activation/deactivation of the PUSCH feedback may be included in the remaining space.

In addition, the PUSCH feedback configuration information may include the kind, the format, the mode etc. of uplink control information to be fed back. For example, if information to be fed back is a CQI, the PUSCH feedback configuration information may include information about a CQI mode, that is, a broadband CQI, a subband CQI, etc. In addition, if a plurality of PUSCH feedbacks is present, the PUSCH feedback configuration information may include information indicating each PUSCH feedback. For example, the PUSCH feedback configuration information may include a PUSCH feedback process ID.

Thereafter, the BS may enable the UE to (re)activate/deactivate the PUSCH feedback through lower layer signaling (S1302). The lower layer signaling includes, but is not limited to, MAC signaling and physical signaling. The physical layer signaling includes, but is not limited to, signaling using a PDCCH. In this case, the CRC of the PDCCH is masked with a Cell Radio Network Temporary Identifier (C-RNTI).

As an example of a UL grant message format when the PDCCH for the periodic PUSCH feedback is transmitted, a message indicating an aperiodic PUSCH feedback defined in the LTE system may be used. In detail, by using a CQI request field of the existing DCI format, periodic PUSCH feedback transmission may be performed using the field of the existing DCI format to the maximum.

First, a method of performing PUSCH feedback on an event basis (that is, aperiodically) using the CQI request field of the DCI format in the existing LTE system will be described. Table 2 shows a portion of a DCI format 0 indicating the aperiodic PUSCH feedback in the LTE system. In the DCI format 0 (see Table 1), if the CQI request field is set to 1, the number of Physical Resource Blocks (PRBs) is 4 or less and $I_{MCS}$ indicating an MCS index is set to 29, the UE aperiodically feeds back downlink channel information (or channel state information (CSI)) through the PUSCH.

TABLE 2

| | bits | aperiodic PUSCH Feedback |
|---|---|---|
| RB assignment | 7 | PRB <= 4 |
| MCS | 5 | $I_{MCS}$ = 29 |
| CQI request | 1 | 1 |

Table 3 shows information about an MCS index for uplink data transmission in the LTE system. 5 bits are used for the MCS and three states ($I_{MCS}$=29 to 31) among states expressed by 5 bits are used for uplink retransmission.

TABLE 3

| MCS Index$I_{MCS}$ | Modulation Order$Q'_m$ | TBS Index$I_{TBS}$ | Redundancy Version$rV_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |

TABLE 3-continued

| MCS IndexI$_{MCS}$ | Modulation OrderQ'$_m$ | TBS IndexI$_{TBS}$ | Redundancy VersionrV$_{idx}$ |
|---|---|---|---|
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | | reserved | 1 |
| 30 | | | 2 |
| 31 | | | 3 |

As described above, in the existing LTE system, CQI request=1 and I$_{MCS}$=29 are used for the aperiodic PUSCH feedback. Accordingly, as an example of the present invention, CQI request=1 and I$_{MCS}$=30 and 31 are used for the periodic PUSCH feedback. However, in consideration of the case where the aperiodic PUSCH feedback is retransmitted, only I$_{MCS}$=31 may be used for the periodic PUSCH feedback.

Table 4 shows a portion of the uplink resource assignment DCI format (e.g., DCI format 0) if the periodic PUSCH feedback is indicated using a CQI request field and an MCS field.

TABLE 4

| | | Periodic PUSCH Feedback | |
|---|---|---|---|
| | bits | Format 1 | Format 2 |
| RB assignment | 7 | PRB <= x (x > 0, e.g., x = 4) | |
| MCS | 5 | I$_{MCS}$ = 30 or 31 | I$_{MCS}$ = 31 |
| CQI request | 1 | 1 | 1 |

If the PUSCH feedback is indicated using the MCS field, the MCS for periodic PUSCH feedback cannot be specified using the PDCCH. In this case, the MCS for the periodic PUCCH feedback may be specified using higher layer (e.g., RRC) signaling. If a plurality of periodic PUSCH feedbacks is necessary, process numbers of the periodic PUSCH feedbacks may be defined in order to distinguish the PUSCH feedbacks from one another.

The activation/deactivation of the periodic PUSCH feedback may be indicated using various methods. For example, activation/deactivation indication information may be directly or indirectly included in the DCI format. In detail, the activation/deactivation indication information may be indicated by using a padding bit included in the DCI format 0 of Table 1 or applying an offset value to the C-RNTI. As another example, the activation/deactivation indication information may be indicated using the remaining fields (or a combination of remaining fields) except for the fields shown in Table 4. As another example, activation is indicated if CQI request=1 and I$_{MCS}$=30 and deactivation is indicated if CQI request=1 and I$_{MCS}$=31. As another example, if a duration when the periodic PUSCH feedback is performed through RRC signaling is given, since only activation indication information is necessary, information indicating the periodic PUSCH feedback may simultaneously indicate the PUSCH feedback activation. In this case, the DCI having the format of Table 4 may be used to identify the PUSCH feedback and to indicate the PUSCH feedback activation.

Meanwhile, it may be difficult to practically transmit the PDCCH for the periodic PUSCH feedback using the DCI format of the existing LTE system. If a plurality of PUSCH feedbacks is performed, a field for distinguishing the feedbacks is insufficient, and moreover uplink transmission is performed in a MIMO mode in the LTE-A system. Thus it may be desirable to define a new format in addition to the existing DCI format. In this case, the newly defined periodic PUSCH feedback activation/deactivation message may include both information indicating the periodic PUSCH feedback and information for distinguishing the plurality of periodic PUSCH feedbacks. The newly defined periodic PUSCH feedback activation/deactivation message may be a message of a new DCI format transmitted through the PDCCH and a message transmitted through a newly defined physical channel.

If a new DCI format is defined for periodic PUSCH feedback, resource assignment for a current subframe and a future subframe using a PDCCH is possible such that the periodic PUSCH feedback is set. That is, when resources are assigned using a UL grant transmitted through a PDCCH, an interval or cycle and a duration field are applied to the transmission of the current subframe and the transmission of the future subframe so as to perform periodic resource assignment. In this case, additional RRC signaling for the periodic PUSCH feedback may be unnecessary. If a plurality of periodic PUSCH feedbacks is supported, an indication for a process number of the periodic PUSCH feedback may also be included in the PDCCH.

Thereafter, if PUSCH feedback is activated, the UE periodically performs PUSCH feedback using resource assignment information (e.g., time information (e.g., subframe), frequency information (e.g., RB), MCS, etc.) reserved in advance and control information format/mode (e.g., CQI mode) predefined in steps S1300 and S1302 (S1304). Uplink control information transmitted through the PUSCH feedback includes, but is not limited to, Channel State Information (CSI), for example, a covariance matrix of a channel, an interference and noise signal level (e.g., a signal-to-noise ratio (SNR), a signal-to-interference-plus-noise ratio (SINR), a carrier-to-interference-plus-noise ratio (CINR), or the like), channel direction information, a PMI, a RI, a CQI, a RSSI, a RSRQ, and the like. Thereafter, if the PUSCH feedback duration has expired or the BS indicates PUSCH feedback deactivation, the UE stops PUSCH feedback transmission.

Embodiment 2 :Periodic PUSCH Feedback Using SPS Signaling

The present embodiment proposes a method for performing a periodic PUSCH feedback using an SPS method of the existing LTE system. The SPS method indicates a method of informing a UE of a subframe interval or radio resource for data transmission/reception in advance, for periodic data transmission/reception. When a UE which receives such information by RRC signaling receives an SPS activation message through a PDCCH from which an SPS C-RNTI is detected, a resource region assigned in the activation message of the PDCCH is assigned as a region for transmitting/receiving SPS data in advance from that time point at a predetermined interval defined in RRC signaling during a time defined in RRC signaling. In the present embodiment, periodic PUSCH feedback configuration information may be signaled to a UE using a method similar to the SPS method and be activated using a PDCCH such that resources for periodic PUSCH feedback are assigned to the UE in advance. In this case, it is necessary to enable the UE to distinguish a general SPS service and a periodic PUSCH feedback.

Meanwhile, if a plurality of SPS services is supported, SPS process IDs may be employed in order to distinguish the plurality of SPS services from one another. In this case, when an SPS configuration message is sent, information indicating to which SPS process ID the SPS configuration corresponds should be specified. RRC signaling indicating the SPS process ID may be transmitted in a state of being included in the existing SPS configuration message or through separate RRC signaling. If the SPS process ID is indicated through RRC signaling, a PDCCH indicating SPS activation/deactivation should inform a UE of indication information (e.g., field) indicating which process is activated/deactivated.

Figure 14:
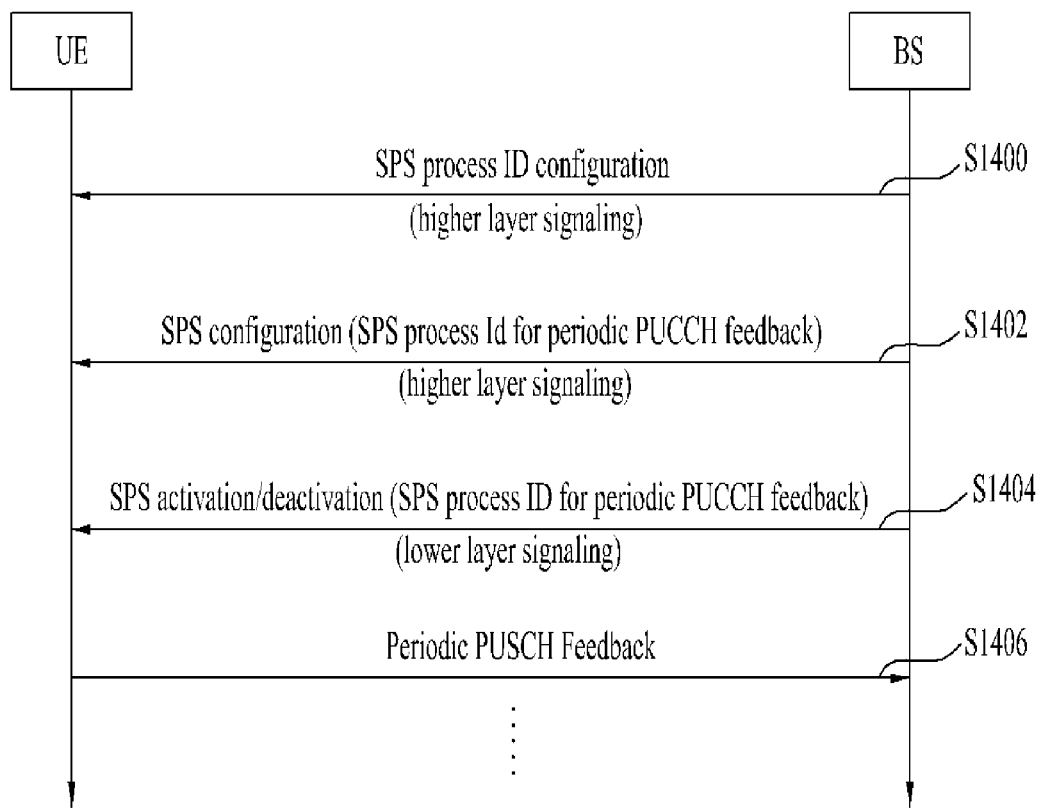

FIG. 14 shows an example of performing periodic PUSCH feedback according to an embodiment of the present invention. A method of distinguishing a plurality of SPS services from one another may be used even in a method of distinguishing periodic PUSCH feedbacks from one another. That is, a UE may distinguish periodic PUSCH feedback and an actual SPS service using an SPS process ID. If a plurality of periodic PUSCH feedback signals is transmitted, SPS process IDs may be differently assigned in order to distinguish the periodic PUSCH feedback signals.

Referring to FIG. 14, a BS transmits SPS process ID configuration information to a UE through higher layer signaling (S1400). The higher layer signaling includes, but is not limited to, RRC signaling. The SPS process ID configuration information includes configuration information on a SPS process ID(s) (first type SPS process ID(s)) for general SPS and a SPS process ID(s) (second type SPS process ID(s)) for periodic PUSCH feedback. Each first type SPS process ID may be given per a SPS service. Similarly each second type SPS process ID may be given per a feedback mode. As an example, SPS process ID configuration information may inform a UE of following information with related to each SPS process ID.

SPS process ID 0: VoIP service
SPS process ID 1: PUSCH feedback mode 1
SPS process ID 2: PUSCH feedback mode 2

The BS may inform the UE which SPS process ID is reserved (or given) for periodic PUSCH feedback among a plurality of SPS process IDs through the SPS process ID configuration information.

The BS transmits SPS configuration information to the UE through higher layer signaling (S1402). The higher layer signaling includes, but is not limited to, RRC signaling. The SPS configuration information includes information about an SPS process ID. If the SPS process ID received through the SPS configuration information is a process ID assigned for periodic PUSCH feedback, the UE analyzes the received SPS configuration information not as a general SPS signal but as a periodic PUSCH signal. In this case, the SPS configuration information may include a variety of information which is exemplarily described with reference to the PUSCH feedback configuration information in Embodiment 1. For example, the SPS configuration information for PUSCH feedback may include at least one of a PUSCCH feedback transmission interval or cycle, a PUSCH feedback transmission duration, partial information of UL grant and the kind/format/mode of uplink control information.

Thereafter, the BS may enable the UE to (re)activate/deactivate PUSCH feedback through lower layer signaling (S1404). The lower layer signaling includes, but is not limited to, MAC signaling or physical signaling.

The physical layer signaling includes, but is not limited to signaling using a PDCCH. In this case, the CRC of the PDCCH for SPS is masked with an SPS C-RNTI. Table 5 shows a DCI format 0 if SPS activation is indicated and Table 6 shows a DCI format 0 if SPS deactivation is indicated.

TABLE 5

| | DCI format 0 |
|---|---|
| TPC command for scheduled PUSCH | set to '00' |
| Cyclic shift DM RS | set to '000' |
| Modulation and coding scheme | MSB is set to '0' |

TABLE 6

| | DCI format 0 |
|---|---|
| TPC command for scheduled PUSCH | set to '00' |
| Cyclic shift DM RS | set to '000' |
| Modulation and coding scheme | set to '11111' |
| Resource block assignment | set to all '1's |

Even when a periodic PUSCH feedback activation/deactivation message is received through a PDCCH, the PDCCH should deliver identification information for distinguishing actual SPS and periodic PUSCH feedback. To this end, the PDCCH may include a field for distinguishing the actual SPS and the periodic PUSCH feedback. In addition, the identification information for the PUSCH feedback may be signaled by setting the value of at least part of the fields shown in Tables 5 and 6 to a specific value. In addition, the identification information for the PUSCH feedback may be indicated by applying an offset value to the SPS RNTI. If a plurality of PUSCH feedbacks is present, a plurality of offset values may be used.

Figure 15:
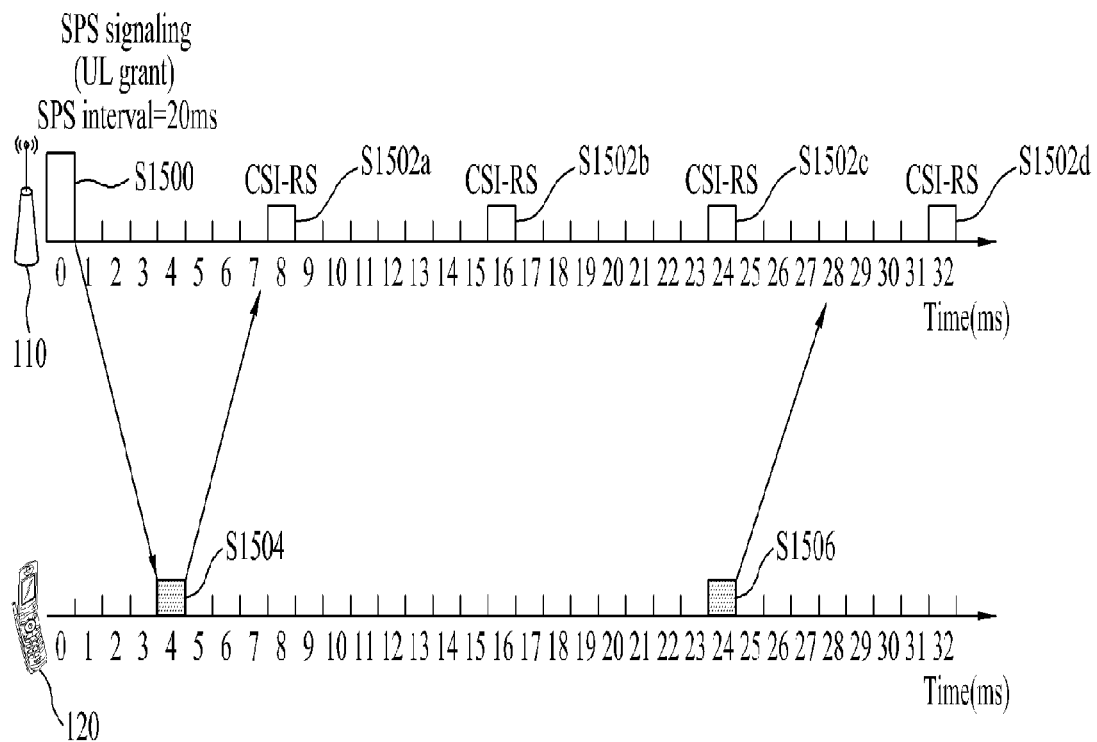

Thereafter, if the PUSCH feedback is activated, the UE periodically performs PUSCH feedback using resource assignment information (e.g., time information (e.g., subframe), frequency information (e.g., RB), MCS, etc.) reserved in advance and control information format/mode (e.g., CQI mode) predefined in steps S1402 and S1404 (S1406). FIG. 15 shows an example of periodically transmitting the PUSCH feedback. In FIG. 15, it is assumed that an SPS interval is 20 ms (or 20 subframes). When the BS indicates PUSCH feedback activation to the UE (S1500), the UE performs the PUSCH feedback at intervals of 20 ms (S1504 and S1506). Uplink control information transmitted through PUSCH feedback includes, but is not limited to, Channel State Information (CSI), for example, a covariance matrix of a channel, an interference and noise signal level (e.g., a signal-to-noise ratio (SNR), a signal-to-interference-plus-noise ratio (SINR), a carrier-to-interference-plus-noise ratio (CINR), or the like), channel direction information, a PMI, a RI, a CQI, a RSSI, a RSRQ, and the like. The uplink control information transmitted through PUSCH feedback may be generated using channel measurement reference signals (e.g., CSI-RS) (S1502a to S1502d) transmitted by the BS. Thereafter, if the PUSCH feedback duration has expired or the BS indicates PUSCH feedback deactivation, the UE halts PUSCH feedback transmission.

Although FIG. 14 shows the case where the SPS process ID configuration information of step S1400 and the SPS configuration information of step S1402 are separately signaled, this is exemplary and the SPS process ID configuration information of step S1400 and the SPS configuration information of step S 1402 may be signaled together. For example, the SPS process ID assignment information may be included as a portion of the SPS configuration information.

Embodiment 3: Control Information for Periodic PUSCH Feedback

In the current LTE system, several feedback modes are present. For example, in transmission of CQI, a RI and PMI, the CQI and the PMI may be simultaneously transmitted or the CQI may be transmitted alone. In addition, wideband CQI, subband CQI, wideband PMI, subband PMI, etc. are present. If the LTE-A system supports CoMP, a UE should feed back channel information regarding multiple cells, that is, CSI. However, the CSI to be fed back may be changed according to the CoMP mode. If several cells cooperate through joint processing or CS/CB, the UE can obtain desired gain by changing the content and/or format of CSI to be fed back.

Accordingly, after a plurality of CSI feedback modes is indicated through higher layer signaling (e.g., RRC signaling), a specific CSI feedback mode may be specified while activating PUSCH feedback through lower layer signaling (e.g., MAC signaling, or PDCCH). The CSI feedback mode includes the content of the CSI, the format of the CSI, etc. To this end, a PDCCH for UL grant should deliver information specifying the CSI feedback mode to the UE. For example, a field indicating the CSI feedback mode may be defined in the DCI format for UL grant using several bits. In this case, the state of the field (or each bit) should be mapped to the CSI feedback mode and the UE should be aware of such mapping. When the bits of the field are changed, the UE may change the CSI feedback mode according to the changed bit content and transmit the CSI. In addition, the CSI feedback mode may be linked with the rank of the downlink channel. The physical meaning of the rank may be a maximum number of pieces of different information which can be transmitted through a given channel. In the wireless communication system, the rank may have the same value as the number of pieces of different information (e.g., layer or stream) which can be simultaneously transmitted by a transmitter.

Meanwhile, if a UE feeds back channel state information, the amount (bit number) of CSI feedbacks is changed according to a downlink rank value. Accordingly, RB assignment information within the PDCCH indicating the periodic PUSCH feedback may be decided based on the amount (bit number) of CSI feedbacks calculated with respect to a specific rank. Accordingly, a PDCCH indicating the periodic PUSCH feedback instructs a UE to perform feedback with the specific rank. The rank value may be directly or indirectly included in UL grant of the PDCCH. For example, a UE may check the amount of resources assigned for PUSCH transmission using RB assignment information in UL grant and indirectly estimate the rank value. When periodic PUSCH feedback is performed, since reserved resources are fixed, a rank for a CSI feedback is also fixed. Accordingly, the rank is not changed until the rank of the periodic PUSCH feedback is changed by a new PDCCH.

Meanwhile, a downlink rank may be changed as necessary during communication. For example, in the CoMP, a downlink rank may be changed depending on whether a plurality of cells cooperates using a joint processing method or a CS/CB method. That is, the downlink rank may be changed according to the CoMP mode. In detail, if the CoMP with a neighboring cell is performed using the JP method when a UE having a maximum rank of 2 is present in a single cell operation, the downlink rank of the UE may be further increased. Accordingly, in the present embodiment, a UE requests that the BS increase or decrease rank. To this end, when the periodic PUSCH feedback is performed, a field (RI recommendation) for making a request for a preferred rank of a UE as well as downlink CSI may be defined. That is, when the periodic PUSCH feedback is performed, the UE may transmit a desired rank together with CSI in uplink. If the desired rank of the UE is greater than a rank for current resource allocation, the CSI feedback may indicate that resources for periodic PUSCH feedback are requested. In contrast, if the desired rank of the UE is less than the rank for current resource allocation, the CSI feedback may request that resources for periodic PUSCH feedback be reduced.

Figure 16:
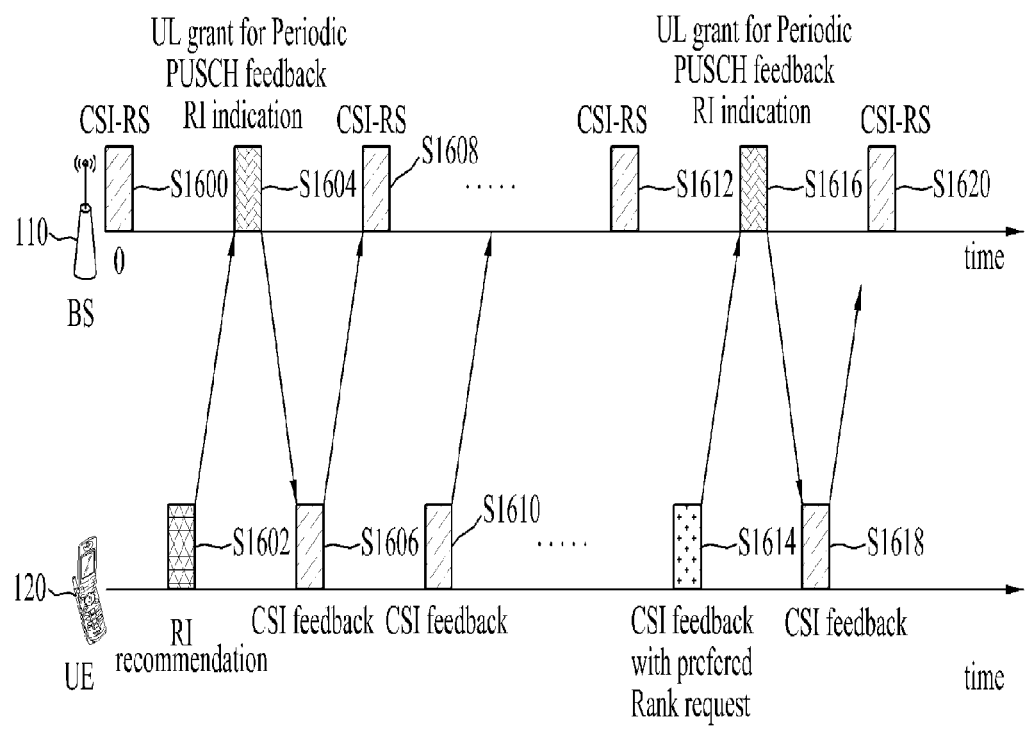

FIG. 16 shows an example of performing periodic PUSCH feedback according to an embodiment of the present invention. Referring to FIG. 16, a BS transmits a channel measurement reference signal (e.g., CSI-RS) to a UE in downlink (S1600, S1608, S1612 and S1620). The UE may recommend a rank value to the BS after channel information is computed using the CSI-RS (RI recommendation) (S1602). Thereafter, the BS transmits UL grant indicating periodic PUSCH feedback activation to the UE in consideration of the recommended RI (S1604). The UL grant delivers information about a downlink rank to the UE. The rank information transmitted through UL grant may be indirectly estimated using resource assignment information. In this case, the rank information transmitted through the UL grant may be different from rank information recommended by the UE. The UE periodically feeds back CSI to the BS through a PUSCH according to the resource assignment information of the UL grant (S1606 and S1610). Thereafter, if the UE wishes to change the downlink rank, the UE may inform the BS of a preferred rank while feeding back the CSI (S1614). If the BS receives the rank information from the UE, it is determined whether or not the rank is changed or whether or not resource assignment is changed. If the rank and resource assignments need to be changed, the UE transmits UL grant indicating periodic PUSCH feedback activation to the UE (S1616) and the UE performs periodic PUSCH feedback using the changed CSI feedback mode (S1618).

For convenience, although, in the present embodiment, the UE reports the rank information, the BS assigns resource for feedback and checks/indicates the rank information, and the UE requests a desired rank using the periodic PUSCH feedback when the UE performs the CSI feedback, this is exemplary and the present embodiment is not limited to the periodic PUSCH feedback and may be used in general CSI feedback.

Embodiment 4: Retransmission Method of Periodic PUSCH Feedback

In periodic PUSCH feedback, uplink control information is periodically transmitted through a data transmission region. Periodic PUSCH feedback design is changed depending on whether or not the uplink control information is retransmitted. If the uplink control information is retransmitted using the existing HARQ method, the information is combined with data received at previous transmission timing so as to increase a reception success probability of a receiver.

The present embodiment proposes a retransmission method different from the existing HARQ method. If the uplink control information which should be transmitted using periodic PUSCH feedback is downlink channel state information, the retransmission of the channel state information which was transmitted at the previous transmission timing is meaningless because the channel has already changed. For example, if a UE computes the quality of a signal received from a serving cell using a CSI-RS, since the CSI-RS is not frequently transmitted, the signal based on the CSI-RS may not be changed upon retransmission. However, an interference signal received from another cell may change. In particular, if the interference signal is computed using a Common Reference Signal (CRS) of the existing LTE system, since the CRS is transmitted on a per subframe basis, a probability of the interference signal changing upon CSI feedback retransmission is high. Accordingly, in the present embodiment, a signal of a serving BS uses the previous CSI-RS measurement value without change and an interference and noise signal generated by a signal of a neighboring BS uses a newly computed value (that is, an updated interference and noise signal).

Figure 17:
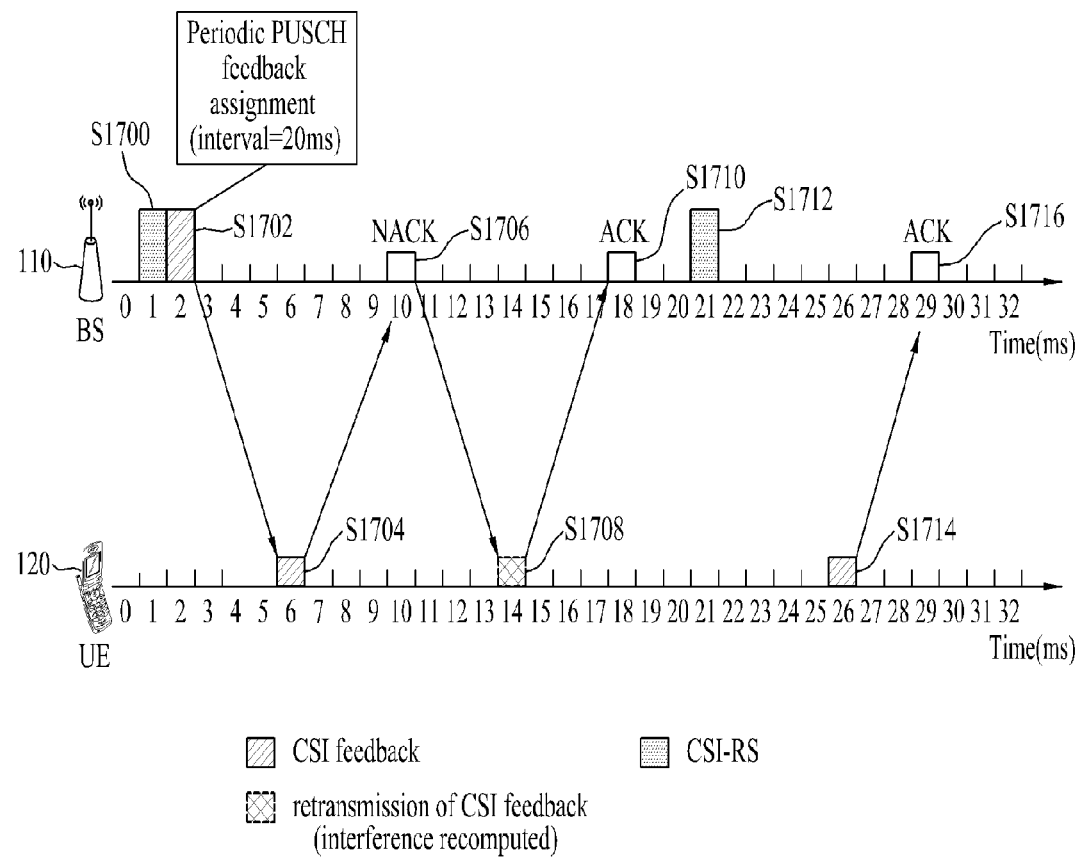
FIG. 17 is a diagram showing an example of a method of retransmitting periodic PUSCH feedback according to another embodiment of the present invention.

FIG. 17 is a diagram showing an example of a method of retransmitting periodic PUSCH feedback according to another embodiment of the present invention.

Referring to FIG. 17, a CSI-RS is transmitted from a first subframe at an interval of 20 ms (S1700 and S1712). It is assumed that a transmission interval for periodic PUSCH feedback is set to 20 ms (or 20 subframes). A UE periodically feeds back a downlink CSI from a sixth subframe based on a recently received CSI-RS after receiving a UL grant message for the periodic PUSCH feedback (S1704 and S1714). However, when a BS transmits a NACK message at a tenth subframe (S1706) with respect to the CSI feedback (S1704), the UE should retransmit CSI information at a fourteenth subframe (S1708). During retransmission (S1708), the UE uses a value measured based on the CSI-RS received in the first subframe as the signal of a serving BS and uses a value newly computed by measuring the CRS transmitted on a per subframe basis in an interference and noise signal of a neighboring BS, thereby reporting the CSI (S1708).

For facilitating the understanding of the present invention, although Embodiments 1 to 4 of the present invention are separately described, these are exemplary and may be combined.

Figure 18:
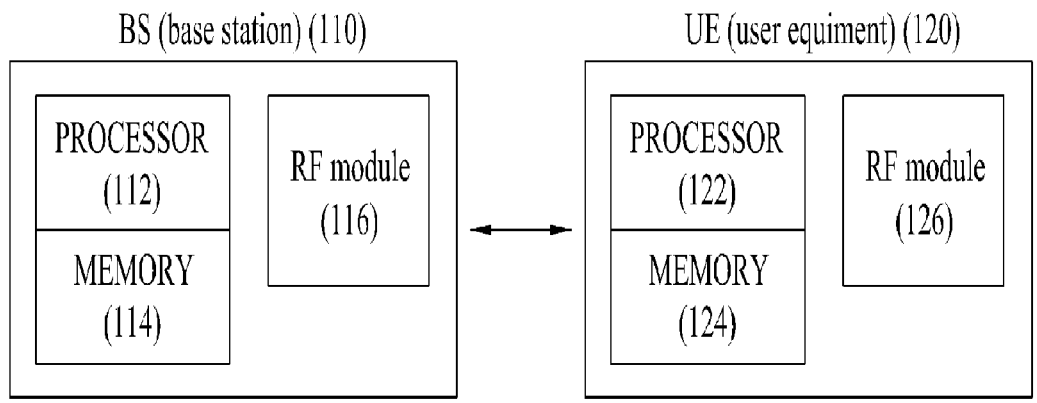
FIG. 18 is a block diagram showing a base station and a UE applicable to the present invention.

FIG. 18 is a block diagram showing a BS and a UE applicable to the present invention.

Referring to FIG. 18, a wireless communication system includes a BS 110 and a UE 120. In downlink, a transmitter is a portion of the BS 110 and a receiver is a portion of the UE 120. In uplink, a transmitter is a portion of the UE 120 and a receiver is a portion of the BS 110. The BS 110 includes a processor 112, a memory 114, and a Radio Frequency (RF) module 116. The processor 112 may be configured to implement procedures and/or methods proposed by the present invention. The memory 114 is connected to the processor 112 so as to store a variety of information associated with the operation of the processor 112. The RF module 116 is connected to the processor 112 so as to transmit and/or receive an RF signal. The UE 120 includes a processor 122, a memory 124 and an RF module 126. The processor 112 may be configured to implement procedures and/or methods proposed by the present invention. The memory 124 is connected to the processor 122 so as to store a variety of information associated with the operation of the processor 122. The RF module 126 is connected to the processor 122 so as to transmit and/or receive an RF signal. The BS 110 and/or the UE 120 may have a single antenna or multiple antennas. Although not shown, the UE 120 may further include at least one of a power management module, a battery, a display, a keypad, a SIM card (optional), a speaker and a microphone.

The above-described embodiments are proposed by combining constituent components and characteristics of the present invention according to a predetermined format. The individual constituent components or characteristics should be considered optional on the condition that there is no additional remark. If required, the individual constituent components or characteristics need not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. In addition, embodiments may be configured by combining claims which do not have an explicit relationship or new claims may be added by amendment after application.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or other network nodes other than the base station. The term "Base Station" may be replaced with fixed station, Node-B, eNode-B (eNB), or access point as necessary. The term "mobile station" may also be replaced with user equipment (UE), mobile station (MS) or mobile subscriber station (MSS) as necessary.

The following embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in a memory unit so as to be driven by a processor. The memory unit is located inside or outside of the processor so as to communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention is applicable to a wireless communication system. In detail, the present invention is applicable to a method and apparatus for transmitting an uplink control signal in a wireless communication system.

The invention claimed is:

1. A method for transmitting uplink control information through a Physical Uplink Shared Channel (PUSCH) at a user equipment (UE) in a wireless communication system, the method comprising:
   receiving, by the UE, a Radio Resource Control (RRC) message indicating a time interval for a periodic PUSCH transmission;
   receiving, by the UE, a Physical Downlink Control Channel (PDCCH) signal indicating activation of the periodic PUSCH transmission;

transmitting, by the UE, first channel-state information through a periodic PUSCH signal according to the time interval; and transmitting, by the UE, second channel-state information through an aperiodic PUSCH re-transmission signal according to a Hybrid ARQ (HARQ) timing if the transmission of the periodic PUSCH signal fails, wherein the second channel-state information is newly computed based on a Common Reference Signal (CRS) at the HARQ timing.

2. The method according to claim 1, wherein the RRC message further includes at least one of Resource Block (RB) assignment information and a Modulation and Coding Scheme (MCS) for the periodic PUSCH transmission.

3. The method according to claim 1, wherein the RRC message further includes identification information indicating that the periodic PUSCH transmission is for the uplink control information.

4. The method according to claim 1, wherein the first channel-state information includes channel quality information based on a Channel State Information Reference Signal (CSI-RS) and interference information based on the CRS, wherein the second channel-state information includes the channel quality information of the first channel-state information and interference information newly updated based on the CRS, and wherein the CSI-RS is transmitted every N subframes, the CRS is transmitted every subframe, and N is a positive integer greater than 1.

5. A user equipment configured to transmit uplink control information through a Physical uplink Shared Channel (PUSCH) in a wireless communication system, the user equipment comprising:

a Radio Frequency (RF) unit configured to transmit or receive an RF signal to or from a transmitter; and a processor connected to the RF unit and configured to receive a Radio Resource Control (RRC) message indicating a time interval for a periodic PUSCH transmission;

receive a Physical Downlink Control Channel (PDCCH) signal indicating activation of the periodic PUSCH transmission;

transmit first channel-state information through a periodic PUSCH signal according to the time interval; and transmit second channel-state information through an aperiodic PUSCH re-transmission signal according to a Hybrid ARQ (HARQ) timing if the transmission of the periodic PUSCH signal fails, wherein the second channel-state information is newly computed based on a Common Reference Signal (CRS) at the HARQ timing.

6. The user equipment according to claim 5, wherein the RRC message further includes at least one of Resource Block (RB) assignment information and a Modulation and Coding Scheme (MCS) for the periodic PUSCH transmission.

7. The user equipment according to claim 5, wherein the RRC message further includes identification information indicating that the periodic PUSCH transmission is for uplink control information.

8. The user equipment according to claim 5, wherein the first channel-state information includes channel quality information based on a Channel State Information Reference Signal (CSI-RS) and interference information based on the CRS, wherein the second channel-state information includes the channel quality information of the first channel-state information and interference information newly updated based on the CRS, and wherein the CSI-RS is transmitted every N subframes, the CRS is transmitted every subframe, and N is a positive integer greater than 1.

* * * * *